US007966888B2

(12) United States Patent
Akita

(10) Patent No.: US 7,966,888 B2
(45) Date of Patent: Jun. 28, 2011

(54) SCREW FASTENER

(75) Inventor: Tadashi Akita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/776,540

(22) Filed: May 10, 2010

(65) Prior Publication Data

US 2010/0218647 A1 Sep. 2, 2010

Related U.S. Application Data

(63) Continuation of application No. PCT/JP2007/071915, filed on Nov. 12, 2007.

(51) Int. Cl.
G01L 5/24 (2006.01)
(52) U.S. Cl. .................. 73/761; 73/862.23
(58) Field of Classification Search .......... 73/761, 73/862.23; 81/57.32, 440; 173/5, 176
See application file for complete search history.

(56) References Cited

U.S. PATENT DOCUMENTS

| 3,965,778 | A | * | 6/1976 | Aspers et al. ............ 81/470 |
| 5,229,931 | A | * | 7/1993 | Takeshima et al. ........ 700/4 |
| 5,837,907 | A | * | 11/1998 | Ohmi et al. ............ 73/862.23 |
| 5,862,904 | A | * | 1/1999 | Tominaga ............ 198/341.03 |
| 6,105,475 | A | * | 8/2000 | Ohmi et al. ............ 81/469 |
| 7,458,282 | B1 | * | 12/2008 | Wuester et al. ........ 73/862.23 |
| 7,586,284 | B2 | | 9/2009 | Akita |
| 7,661,335 | B2 | * | 2/2010 | Kuboyama ............ 81/54 |
| 7,665,366 | B2 | | 2/2010 | Akita |
| 7,759,893 | B2 | * | 7/2010 | Akita ............ 318/567 |
| 2008/0314162 | A1 | * | 12/2008 | Inoue ............ 73/862.23 |
| 2008/0314197 | A1 | * | 12/2008 | Honma ............ 74/815 |
| 2008/0314204 | A1 | * | 12/2008 | Kuboyama ............ 81/57.42 |

FOREIGN PATENT DOCUMENTS

| JP | 62-136379 | A | 6/1987 |
| JP | 63-68330 | A | 3/1988 |
| JP | 3-221332 | A | 9/1991 |
| JP | 7-308865 | A | 11/1995 |
| JP | 11-188655 | A | 7/1999 |
| JP | 2959244 | B2 | 10/1999 |
| JP | 2959582 | B2 | 10/1999 |
| JP | 3569619 | B2 | 9/2004 |
| WO | 2007/099628 | A1 | 9/2007 |
| WO | 2007/105257 | A1 | 9/2007 |

OTHER PUBLICATIONS

International Search Report of PCT/JP2007/071915, mailing date of Dec. 4, 2007.

* cited by examiner

*Primary Examiner* — Freddie Kirkland, III
(74) *Attorney, Agent, or Firm* — Westerman, Hattori, Daniels & Adrian, LLP

(57) ABSTRACT

A screw fastener includes a first screwdriver including a first bit configured to fasten a first screw by engaging with a recess of the first screw, and a first motor configured to rotate the first bit, a second screwdriver including a second bit configured to fasten a first screw by engaging with a recess of the second screw, and a second motor configured to rotate the second bit, an elevator unit configured to simultaneously ascend and descend both the first screwdriver and the second screwdriver, and a controller configured to control the first motor and the second motor so that seating of the first screw can start after torquing-up of the second screw starts.

12 Claims, 16 Drawing Sheets

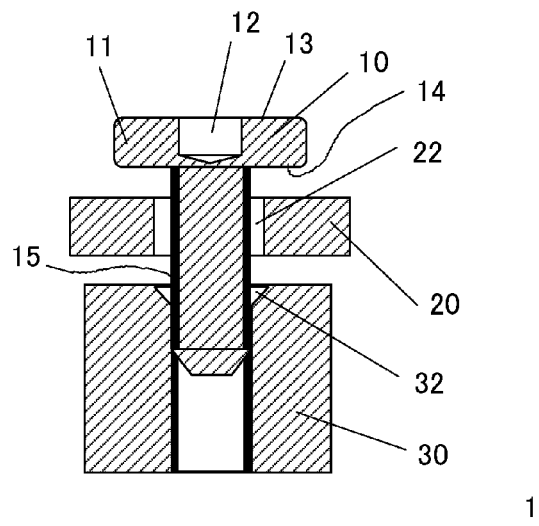
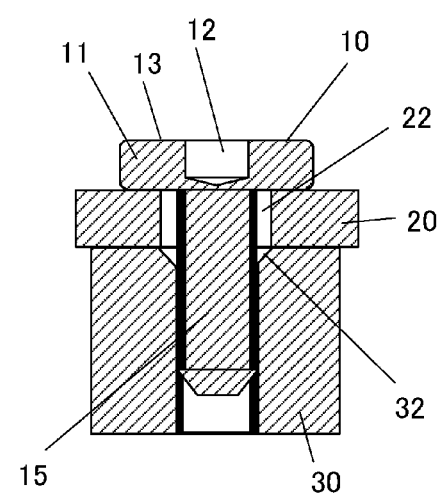
FIG. 2A      FIG. 2B
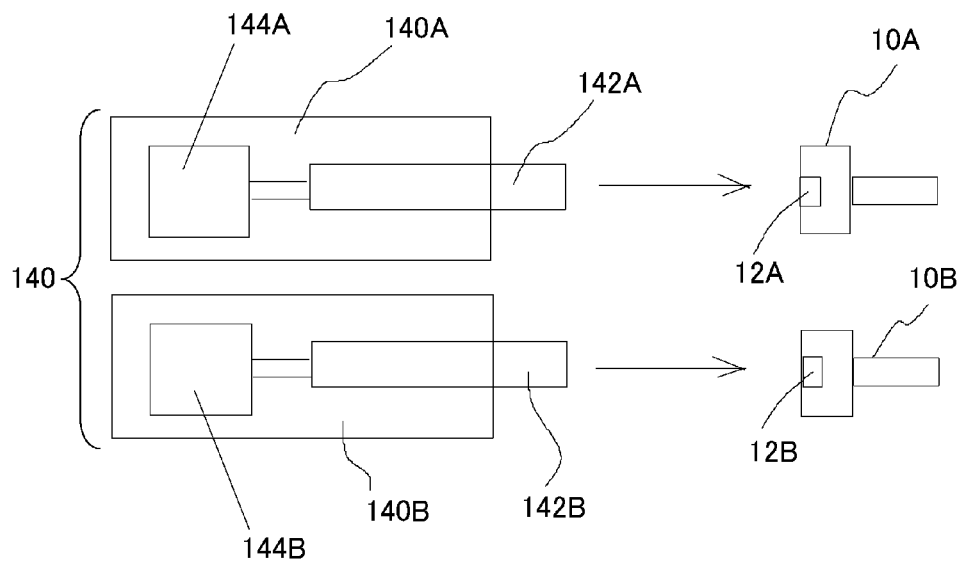
FIG. 3

PRIOR ART

US 7,966,888 B2

SCREW FASTENER

CROSS-REFERENCE TO RELATED APPLICATIONS

This application is based upon and claims the benefit of priority of the prior Japanese Patent Application No. PCT/JP2007/071915, filed on Nov. 12, 2007, the entire contents of which are incorporated herein by reference.

FIELD

The embodiment(s) discussed herein are related to an automatic screw fastener configured to automatically fasten a screw.

BACKGROUND

Automatic screw fastening uses a screwdriver having a bit engageable with a recess of a screw to fasten the screw that can be inserted into a screw hole in a work. In order to inexpensively supply works, a supply of a small and low-priced automatic screw fastener having an increased throughput is important.

In order to fasten a plurality of screws, the fastening time of a certain screw may need to shift from the fastening time of another screw. For example, as depicted in FIG. 14, in screwing a disc-shaped lid 1 having a packing (not depicted) on the bottom, screws 2 arranged around the lid 1 are first fastened completely and then a center screw 3 is fastened so as to reduce a deformation and a position shift of the lid 1. For similar reasons, as depicted in FIG. 15, in screwing a rectangular lid 6, an internal screw 8 can be fastened after screws 7 arranged around the lid 6 are fastened. For example, the lid depicted in FIG. 14 may be a clamp ring configured to clamp discs in a hard disc drive ("HDD"). The screw 8 depicted in FIG. 15 may be used to fix a head stack assembly ("HSA") having a carriage mounted with a head and configured to rotate in the HDD.

Prior art include, for example, Patent Documents 1-7:
Patent Document 1: Japanese Patent No. 3569619.
Patent Document 2: Japanese Patent No. 2959244.
Patent Document 3: Japanese Laid-open Patent Publication No. 11-188655.
Patent Document 4: Japanese Patent No. 2959582.
Patent Document 5: Japanese Laid-open Patent Publication no. 7-308865.
Patent Document 6: PCT International Publication No. 2007/099628 (corresponding to U.S. Pat. No. 7,665,366).
Patent Document 7: PCT International Publication No. 2007-105257 (corresponding to U.S. Pat. No. 7,586,284).

In order to fasten two types of screws at different times in an automatic multi-axial screw fastener, it is conceivable to provide two fastening steps for these screws. In this case, the first step fastens the first screw and the next step fastens the second screw. However, these two fastening steps require two separate elevator units for a first screwdriver (or bit) configured to fasten the first screw and a second screwdriver (or bit) configured to fasten the second screw, causing the screw fastener to be large and expensive. In addition, when the second step follows the first step, a total fastening time period becomes longer and the throughput lowers.

SUMMARY

A screw fastener according to one aspect of the embodiment includes a first screwdriver including a first bit configured to fasten a first screw by engaging with a recess of the first screw, and a first motor configured to rotate the first bit, a second screwdriver including a second bit configured to fasten a first screw by engaging with a recess of the second screw, and a second motor configured to rotate the second bit, an elevator unit configured to simultaneously ascend and descend both the first screwdriver and the second screwdriver, and a controller configured to control the first motor and the second motor so that seating of the first screw can start after torquing-up of the second screw starts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2A is a partially sectional view depicting a positional relationship among a screw, a component, and a work when the screw is partially inserted into a screw hole.

FIG. 2B is a partially sectional view showing a positional relationship among the screw that has been seated, the component, and the work.

FIG. 3 is a block diagram for explaining a classification of a screwdriver depicted in FIG. 1.

DESCRIPTION OF EMBODIMENTS

Figure 1:
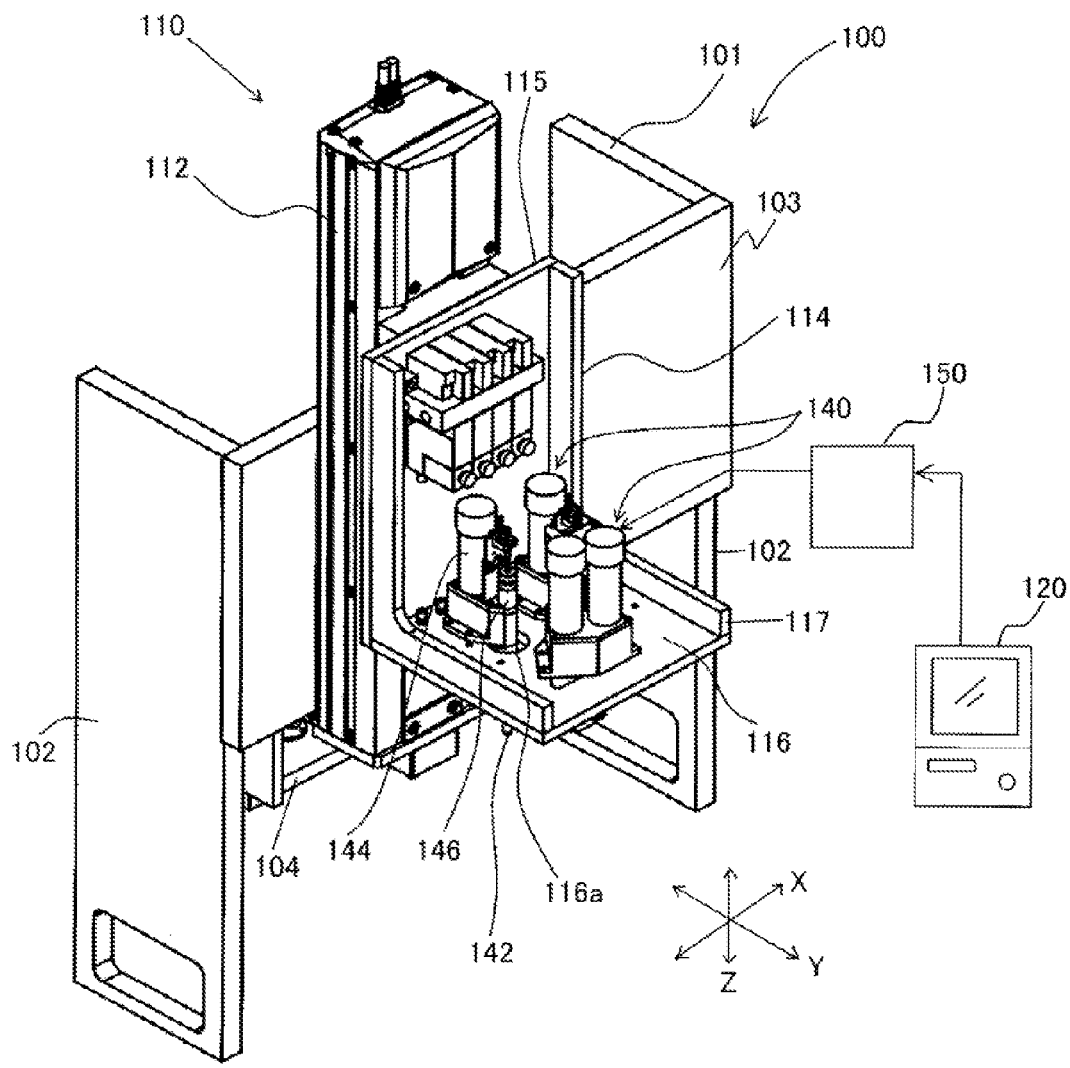
FIG. 1 is a perspective view of a screw fastener according to one embodiment.

FIG. 1 is a perspective view of a screw fastener 100 according to one embodiment. The screw fastener 100 includes a support frame 101, an elevator unit 110, a main controller or a host controller 120, and a plurality of screwdrivers 140.

The support frame 101 includes a pair of vertical plates 102, a horizontal plate 103 fixed on the upper portions of the pair of vertical plates 102. Each vertical plate 102 extends in the Z direction in FIG. 1. The horizontal plate 103 extends in the X direction depicted in FIG. 1. The elevator unit 110 is fixed onto the front surface side of the horizontal plate 103, and a housing table 104 mounted with a power unit and a mechanical unit (not depicted) of the elevator unit 110 is fixed onto the back surface side of the horizontal plate 103.

The elevator unit 110 includes a mechanical unit 112, and a support table 114 having an L-shaped section. The support table 114 includes a vertical member 115, a horizontal member 116, and a pair of rims 117.

The vertical member 115 of the support table 114 is fixed onto the mechanical unit 112, and the mechanical unit 112 is configured to ascend and descend the vertical member 115 in the Z direction in FIG. 1. The vertical member 115 extends in the Z direction in FIG. 1. The plurality of screwdrivers 140 are attached to the horizontal member of the support table 114. The horizontal member 116 extends in the Y direction in FIG. 1.

The elevator unit 110 is configured to ascend and descend the first screwdriver and the second screwdriver, which will be described later. Since one elevator unit 110 is commonly used for the plurality of screwdrivers 140, the screw fastener 100 becomes smaller and less expensive than a screw fastener in which each screwdriver 140 has a separate elevator unit 100. In addition, common ascending and descending for all the screwdrivers 140 shorten a screw fastening time period and improve a throughput in comparison with separate ascending and descending.

Although FIG. 1 shows four screwdrivers 140, the number of screwdrivers is not limited as long as the number of screwdrivers is plural because the screw fastener 100 is an automatic multi-axial screw fastener configured to automatically control actions of a plurality of screwdrivers 140.

The driver 140 is configured to rotate a bit 142 that downwardly extends in the Z direction from the horizontal member 116 through a perforation hole 116a formed in the horizontal member 116, and to fasten a screw for a work (an object to be fastened) (not depicted) located under the horizontal member 116. The bit 142 is configured to engage with a recess of the screw and to fasten the screw.

FIG. 2A is a partially sectional view depicting a positional relationship among a screw 10, a component 20, and a work 30, where the screw 10 is partially inserted into the screw hole. FIG. 2B is a partially sectional view depicting a positional relationship among the screw 10 that has been seated, the component 20, and the work 30. FIG. 2A may be regarded as a view of a provisional fastening state. A recess 12 is formed at the center of a front surface 13 of a screw head 11 of the screw 10. The bit 142 is rotated while its tip is engaged with the recess 12 of the screw 10. A seat 14 of the screw head 11 opposes to a surface around a clearance hole 22 of the component 20. A screw portion 15 of the screw 10 is inserted into the clearance hole 22 of the component 20 and a screw hole 32 of the work 30. In this embodiment, the component 20 is, for example, a clamp ring, and the work 30 is, for example, a spindle hub, which is fixed in a housing of an HDD.

This embodiment classifies, as depicted in FIG. 3, the screwdrivers 140 into at least two types, a first driver and a second driver, which will be referred to as a first screwdriver 140A and a second screwdriver 140B, if it becomes necessary to distinguish them.

Figure 14:
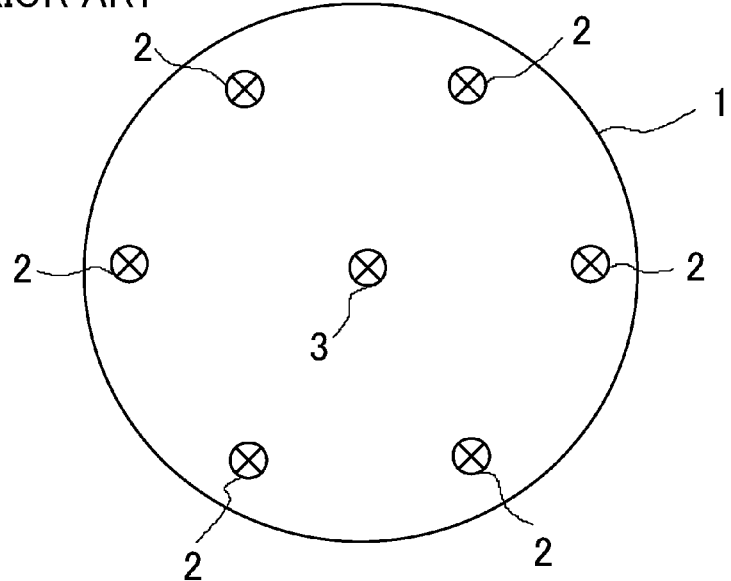
FIG. 14 is a plane view depicting illustrative multi-axial screw fastening.
Figure 15:
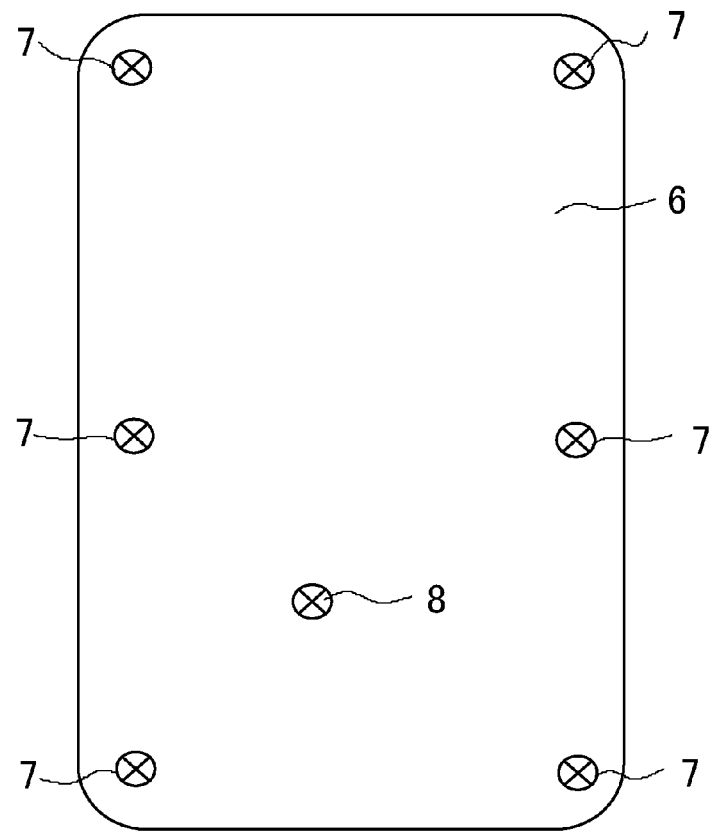
FIG. 15 is a plane view depicting another illustrative multi-axial screw fastening.

The first screwdriver 140A includes a first bit 142A configured to engage with a recess 12A of a first screw 10A and to fasten the first screw 10A, and a first motor 144A configured to rotate the first bit 142A. The second screwdriver 140B includes a second bit 142B configured to engage with a recess 12B of a second screw 10B and to fasten the second screw 10B, and a second motor 144B configured to rotate the second bit 142B. The first screw 10A is, for example, the screw 3 depicted in FIG. 14 and the screw 8 depicted in FIG. 15, and the second screw 10B is the screw 2 depicted in FIG. 14 and the screw 7 depicted in FIG. 15.

The main controller 120 communicates with a servo controller 150 provided for each screwdriver 140. The main controller 120 includes a computer and is configured to control the first motor 144A and the second motor 144B so that seating of the first screw 10A starts after torquing-up of the second screw 10B starts. Here, "seating" means a contact between the seat 14 of the screw 10 and the surface around the screw hole (clearance hole 22 of the component 20 in FIG. 2B), and "torquing-up" means that the seated screw 10 is fastened and fixed with a predetermined torque. The phrase "after torquing-up starts" coverts not only that torquing-up is completed but also that torquing-up is in progress.

Figure 4:
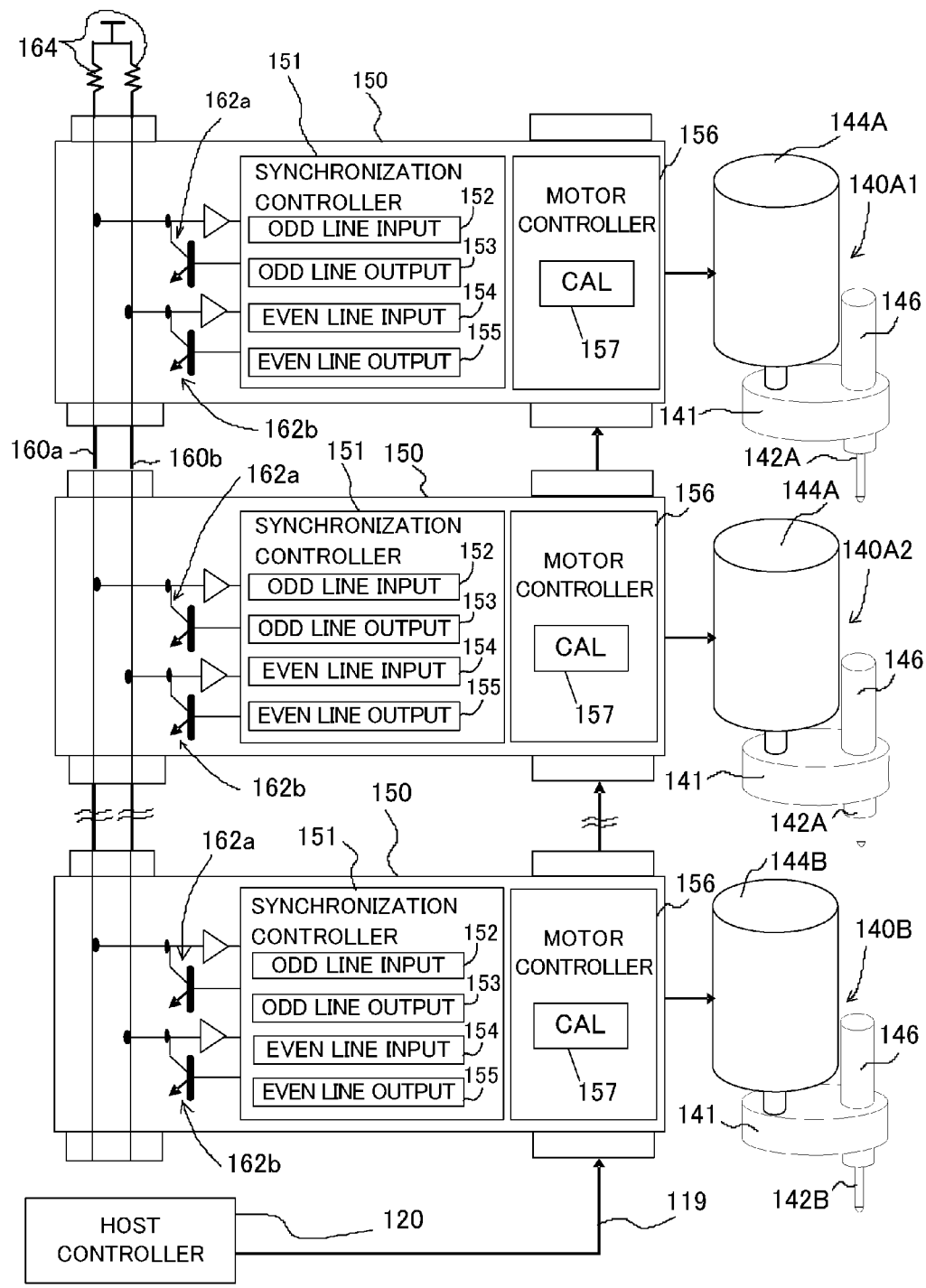
FIG. 4 is a block diagram depicting a control system of the screw fastener depicted in FIG. 1.
Figure 5A:
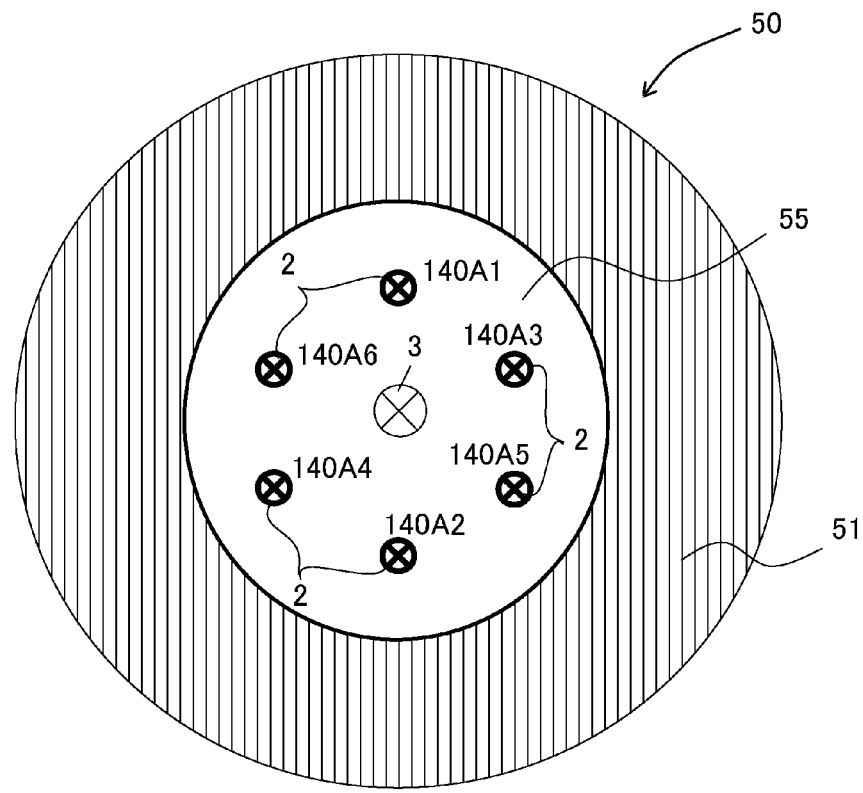
FIG. 5A is a partially enlarged plane view of an HDD to be screwed by the screw fastener depicted in FIG. 1.

FIG. 4 is a block diagram of the control system of the screw fastener 100, which is configured to control seven screwdrivers 140A1 to 140A6 and 140B, although FIG. 4 shows only three screwdrivers 140A1, 140A2, and 140B. FIG. 5A shows a relationship between screws 2 and 3 corresponding to the screwdrivers 140A to 140A6 and 140B.

Each screwdriver 140 includes, as depicted in FIG. 4, a motor 144 as a driving source, a bit 142 at its top or bottom end engageable with the recess 12 on the screw head 11 of the screw 10, and a bit driver 146 configured to drive the bit 142 using a driving force transmitted from the motor 144. Although omitted in FIG. 4, the bit driver 146 has an output shaft that can be detachably engaged with the bit 142.

In FIG. 4, housed in a casing 141 that holds the motor 144 and the bit driver 146 is a reduction gear row configured to transmit a driving force from an input gear attached to an output shaft of the motor 144 to the driving gear that rotates together with the above output shaft. The motor 144 may use a brush motor or a brushless motor.

The servo controller 150 directly controls driving of each screwdriver 140, and is provided for each screwdriver 140. The main controller 120 sends a variety of operational commands to the seven servo controllers 150 via a communication line 119, such as RS-485.

The servo controller 150 includes a synchronization controller 151 connected to a first wired OR line 160a and a second wired OR line 160b, and a motor controller 156 configured to control the voltage or current to be applied to the motor 144. The motor controller 156 includes an operating unit or calculator (CAL) 157 made of an MPU, etc. The servo controller 150 includes a first transistor 162a and a second transistor 162b that constitute an input/output circuit among the synchronization controller 151, the first wired OR line 160a, and the second wired OR line 160b. Each of the first transistor 162a and the second transistor 162b have an open collector configured to provide an output to the first wired OR line 160a and an output to the second wired OR line 160b.

Although this embodiment uses an open collector output of the transistor to form a wired OR circuit (a circuit that becomes an OR gate in the negative logic by directly coupling the output of the TTL logic), but may form a wired OR circuit using an open drain output of a CMOS instead of the transistor.

As depicted in FIG. 4, a pull-up resistor 164 is connected to each end of the first wired OR line 160a and the second wired OR line 160b.

The synchronization controller 151 includes an odd line input circuit 152 and an odd line output circuit 153 connected to the first wired OR line 160a, and an even line input circuit 154 and an even line output circuit 155 connected to the second wired OR line 160b. The odd line output circuit 153 is a circuit configured to output a signal indicative of an odd-number-th synchronization waiting state in the screwdrivers 140A1 to 140A6, and the even line output circuit 155 is a circuit configured to output a signal indicative of an even-number-th synchronization waiting state in the screwdrivers 140A1 to 140A6. The odd line input circuit 152 is a circuit configured to detect a state of the first wired OR line 160a, and the even line input circuit 154 is a circuit configured to detect a state of the second wired OR line 160b.

Figure 5B:
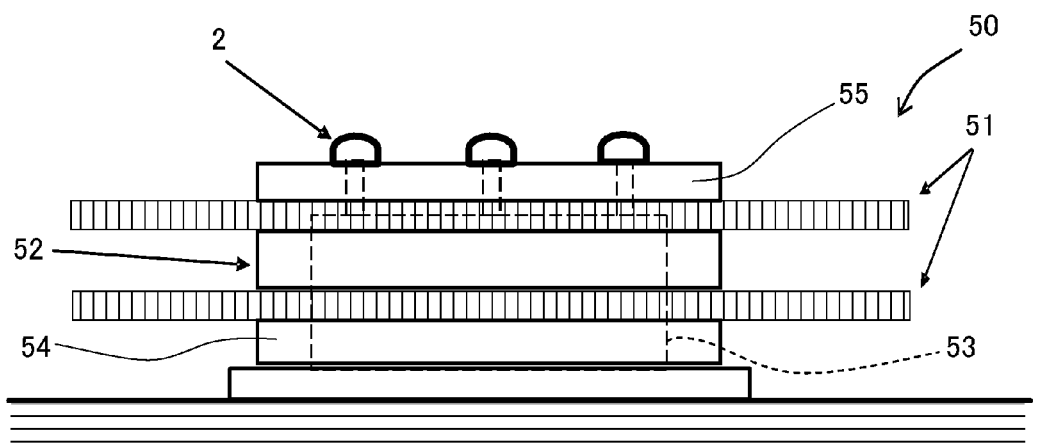
FIG. 5B is a side view of FIG. 5A.

The screw fastener 100 is used to fasten a screw, for example, of a clamp ring 55 in the HDD depicted in FIGS. 5A and 5B. FIG. 5A is a plane view around the clamp ring 55, and FIG. 5B is its side view.

A magnetic disc unit 50 includes a pair of magnetic discs 51 that are vertically stacked via a spacer 52, and a spindle motor 53 configured to rotate the magnetic discs 51. A bearing 54, the magnetic discs 51, and the spacer 52 are concentrically stacked around the outer circumference of the spindle motor 53, and the clamp ring 55 is arranged on the upper magnetic disc 51.

The clamp ring 51 is coupled with a hub of the spindle motor 53 via six screws 2 arranged at vertexes of a regular hexagon and one center screw 3, as depicted in FIG. 5A. FIG. 5A schematically shows the screwdrivers 140A1 to 140A6 corresponding to these screws 2. In this embodiment, the screwdrivers 140A1 and 140A2, the screwdrivers 140A3 and 140A4, and the screwdrivers 140A5 and 140A6 are paired, and the bits 142 of a pair of screwdrivers 140 in each pair are arranged with an angular interval of 180° around the center of the screw 3. Due to the screws 2 and 3, the clamp ring 55 fixes the discs 51 and the spacer 52 onto the spindle motor 53. Thereby, as the spindle motor 53 rotates, the magnetic discs 51 rotate and the magnetic head (not depicted) is ready to record information in and reproduce the information from the magnetic discs 51.

In this embodiment, the main controller 120 drives the elevator unit 110 and simultaneously descends all the screwdrivers 140 (or the first screwdrivers 140A and the second driver 140B). In this embodiment, the tip of each bit 142 attracts the screw 10 via a magnetic force or a vacuum absorption, and the bit 142 is inserted into the recess 12 of each screw 10. Only when the elevator unit 110 simultaneously descends all the screwdrivers 140, the screws 2 and 3 are arranged on the screw hole (not depicted) of the clamp ring 55 and become ready to fasten. However, it is not always necessary to mount the screw 2 or 3 at the tip of the bit 142, and the screws 2 and 3 are arranged in the screw hole (not depicted) of the clamp ring 55 by another apparatus or manually in another embodiment.

Next, the main controller 120 controls driving of the first motor 144A and driving of the second motor 144B so that the first bit 142A and the second bit 142B can simultaneously rotate or the first bit 142A can stop and the second bit 142B can rotate.

The main controller 120 controls driving of the first motor 144A and driving of the second motor 144B so that seating of the first screw 10A can start after torquing-up of the second screw 10B starts. Some methods can provide this effect:

According to the first method, the screw portion of the first screw 10A is longer than the screw portion of the second screw 10B. Thereby, seating of the first screw 10A can be made later than seating of the second screw 10B even when fastening of the second screw 10B and fastening of the first screw 10B start at the same time and at the same bit rotation velocity. By adjusting a difference of the length between the screw portion of the first screw 10A and the screw portion of the second screw 10B, torquing-up of the second screw 10B can proceed to some extend until the first screw 10A is seated.

The second method is to control the first motors 144A and the second motor 144B so that the rotation velocity of the first bit 142A is smaller than that of the second bit 142B. Thereby, even when the screw portion of the first screw 10A and the screw portion of the second screw 10B have the same length or different lengths, seating of the first screw 10A can be made later than seating of the second screw 10B even when fastening of the second screw 10B and fastening of the first screw 10B start at the same time. By adjusting a rotational velocity difference between the bits 142A and 142B, torquing-up of the second screw 10B can proceed to some extend until the first screw 10A is seated. The first method and the second method can be combined with each other.

According to the third method, fastening rotation of the first bit 142A starts later than that of the second bit 142B. By adjusting a delay time period, torquing-up of the second screw 10B can proceed to some extent until the first screw 10A is seated. The third method may be combined with the first method and/or the second method.

Figure 6:
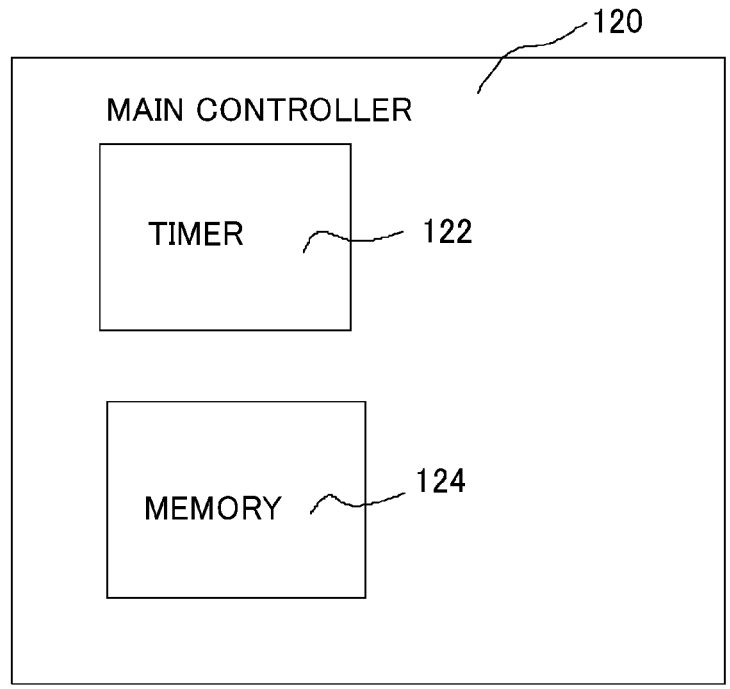
FIG. 6 is a block diagram for explaining one illustrative structure of a main controller of the screw fastener depicted in FIG. 1.

According to one embodiment that achieves the third method, the main controller 120 of the screw fastener 100 includes, as depicted in FIG. 6, a timer 122 and a memory 124 configured to store a setting time period. The main controller 120 allows the timer 122 to start measuring time when the fastening rotation of the second motor 144B starts or when descending of the elevator unit 110 is completed. The main controller 120 drives the first motor 144A when determining that the timer 122 has measured the setting time period. The start time of the first motor 144A is determined by the timer 122. It is optional that the first bit 142A completes fastening the first screw 10A as soon as the second bit 142B completes fastening the second screw 10B. Since the structure depicted in FIG. 6 does not actually detect the state of the second bit 142B, the main controller 120 has a simpler and less expensive configuration. The setting time period stored in the memory 124 is a time period necessary for torquing-up of the second screw 10B to proceed to some extent.

Figure 7:
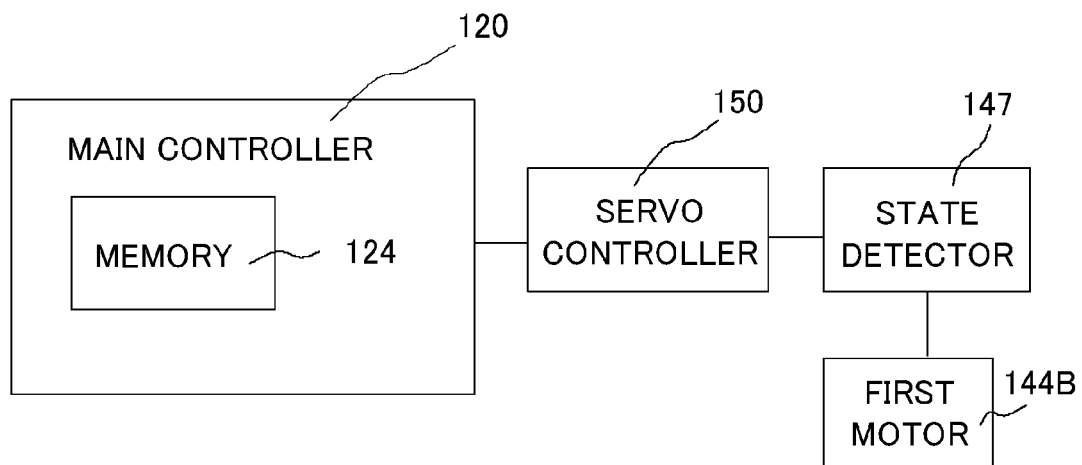
FIG. 7 is a block diagram for explaining another illustrative structure of the main controller of the screw fastener depicted in FIG. 1.
Figure 8:
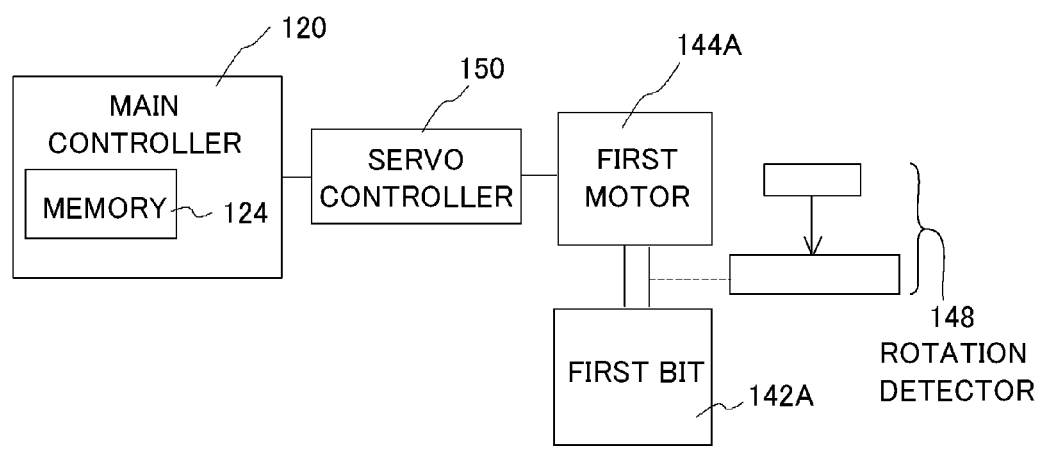
FIG. 8 is a block diagram for explaining still another illustrative structure of the main controller of the screw fastener depicted in FIG. 1.

According to another embodiment that achieves the third method, the main controller 120 of the screw fastener 100 includes a memory 124 configured to store a setting state as depicted in FIG. 7, and the second bit 142B of the second driver 140B is connected to a state detector 147 configured to detect a torquing-up state of the second screw 10B. The servo controller 150 informs the memory controller 120 of the detection result of the state detector 147. The main controller 120 drives the first motor 144A when determining that the state detector 147 detects the setting state stored in the memory 124. The start time of the first motor 144A is determined based on the detection result of the state detector 147. The state detector 147 is, for example, a detector configured to detect a change of a rotation velocity of the second bit 142. It is optional that the first bit 142A completes fastening the first screw 10A as soon as the second bit 142B completes fastening the second screw 10B. Since the structure depicted in FIG. 7 enables the first screw 10A to be fastened when the state of the second screw 10B actually becomes the setting state, the deformations, the positional shifts, and inclinations of the component and the work can be effectively prevented. The setting state is a state in which torquing-up of the second screw 10B proceeds to some extent.

According to the fourth method, the main controller 120 controls driving of the first motor 144A and driving of the second motor 144B so that the first bit 142A and the second bit 142B can be simultaneously rotate for fastening, and then the first bit 142A is paused before the first screw 10A is seated. The second screw 10B continuously transfers to torquing-up and driving of the first motor 144A resumes after torquing-up of the second screw 10B starts. That the first bit 142A and the second bit 142B "simultaneously rotate for fastening" allows a slight time difference that can be regarded as a simultaneous rotation. The resume time is time when torquing-up of the second screw 10B proceeds to some extent. By fastening the first screw 10A to a state prior to seating together with the second screw 10B, the throughput is higher than a throughput that starts a rotation of the first screw 10A after torquing-up of the second screw 10B proceeds to some extent. In order to maximize the throughput, the pause may be provided at a rotation amount just before the first screw 10A is seated.

According to one embodiment that achieves the fourth method, the main controller 120 of the screw fastener 100 includes a memory 124 configured to store a predetermined rotation amount of the first bit 10A before the first screw 10A is seated after fastening of the first screw 10A starts. In addition, a rotation detector 148 is provided and configured to detect a rotation amount of the first bit 142A. The rotation detector 148 includes, for example, a rotary encoder. The servo controller 150 informs the main controller 120 of the detection result of the rotation detector 148. When the rotation amount detected by the rotation detector 148 reaches the predetermined rotation amount stored in the memory 124, the main controller 120 pauses the first motor 144A and then resumes it. As described above, in order to maximize the throughput, the predetermined rotation amount stored in the memory 124 may be the rotation amount just before the first screw 10A is seated.

The main controller 120 can determine the resume time of driving of the paused first motor 144A using the structure depicted in FIG. 6 or 7.

In the structure depicted in FIG. 6, the main controller 120 includes a timer 122 and a memory 124 configured to store the setting time period. The main controller 120 allows the timer 122 to measure time, for example, when the main controller 120 pauses a rotation of the first motor 144B. The main controller 120 resumes driving of the first motor 144A when determining that the time 122 has measured the setting time period. The resume time of driving of the first motor 144A is determined by the timer 122. It is optional that the first bit 142A completes fastening the first screw 10A as soon as the second bit 142B completes fastening the second screw 10B. Since the structure depicted in FIG. 6 does not actually detect the state of the second bit 142B, the main controller 120 becomes a simpler and less expensive configuration. The setting time period stored in the memory 124 is a time period necessary for torquing-up of the second screw 10B to proceed to some extent.

In the structure depicted in FIG. 7, the main controller 120 includes a memory 124 configured to store the setting time period, and the second bit 142B of the second driver 140B is connected to the state detector 147 configured to detect a torquing-up state of the second screw 10B. The main controller 120 resumes driving of the first motor 144A when determining that the state detector 147 detects the setting state stored in the memory 124. The resume time of driving of the first motor 144A is determined by the detection result of the state detector 147. It is optional that the first bit 142A completes fastening the first screw 10A as soon as the second bit 142B completes fastening the second screw 10B. Since the structure depicted in FIG. 7 enables the first screw 10A to be fastened when the state of the second screw 10B actually becomes the setting state, the deformations, the positional shifts, and inclinations of the component and the work can be effectively prevented. The setting state is a state in which torquing-up of the second screw 10B proceeds to some extent.

Figure 9:
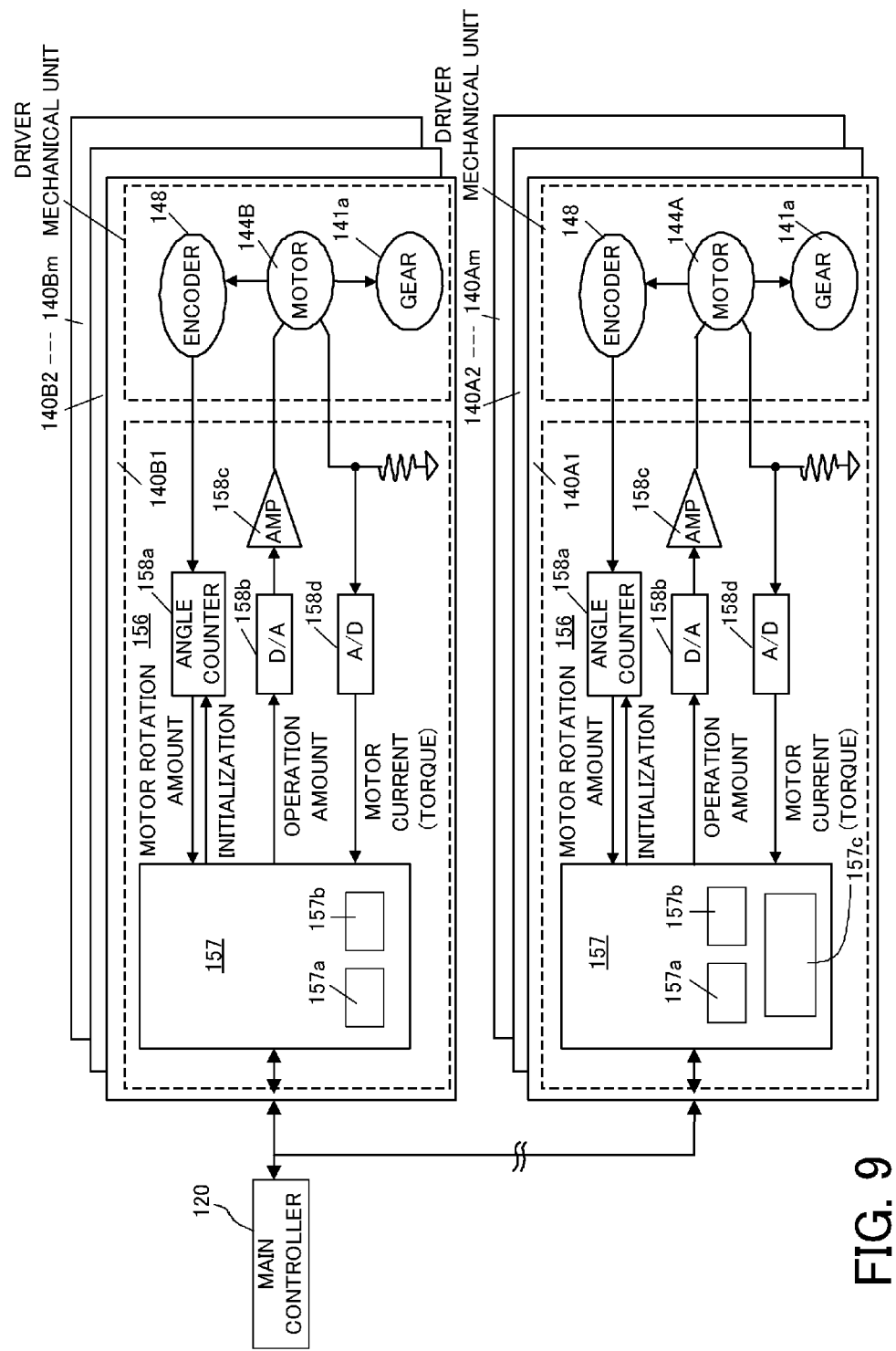
FIG. 9 is a block diagram for explaining a variation of a servo controller in the screw fastener depicted in FIG. 1.

While FIGS. 6 and 7 provide the timer 122 and the memory 124 in the main controller 120, they may be parts of the motor controller 156 of the servo controller 150. FIG. 9 shows this embodiment. FIG. 9 is a block diagram of a variation of the control system of the screwdriver 140, and the first driver 140A, and the second driver 140B are generalized by 140A1, 140A2, . . . , 140Am, 140B1, 140B2, . . . , 140Bm.

The calculator 157 is made of an MPU, which is a micro controller configured to control the motor 144 in accordance with a command of a switch (not depicted). The calculator 157 includes a memory 157a that includes a ROM configured to store a program and a RAM for temporary storage in the same chip. The memory 157a stores a time period value to release the pause, a velocity setting value, a torque-up pattern in the torque control, etc. Thereby, the calculator 157 can execute a screw fastening sequence. The calculator 157 further includes a timer 157b, which includes a counter configured to measure the number of crystal oscillation clocks, and thus can measure a time period. Thereby, a precise time period can be maintained before the pause is released, etc. In addition, the calculator (MPU) 157 may further include such peripheral circuits as an angular counter 158a, a D/A converter 158b, a power amplifier 158c, and an A/D converter 158d that are illustrated outside of the calculator 157 in FIG. 9.

The angular counter 158a is an up/down counter configured to measure a rotation amount of the motor 144, and measures an output pulse of the incremental type encoder 148. In addition, the calculator 157 converts a measurement value of the rotation amount of the motor 144 into a bit rotation amount by dividing the measurement value by a reduction gear ratio. The bit rotation amount is initialized to 0 when an operation starts using a start lever or switch (not depicted) so as to measure a bit rotation amount in the subsequent operation. The calculator 157 calculates a bit rotation velocity by measuring an increase or decrease amount of the bit rotation amount for each unit time period (which is about 1 msec) and by dividing the measurement result by the time interval.

The D/A converter 158 converts into an analogue voltage a digital operation amount to the motor 144 which is calculated by the calculator 157 for the torque control, velocity control, and angular control, and outputs the analogue voltage to the power amplifier 158c.

The power amplifier 158c drives the motor 144 with a voltage in proportion to the output of the D/A converter 158b. Alternatively, the motor 144 may be completely digitally driven by replacing the D/A converter 158b with a PWM (pulse width modulator) and the power amplifier 158c with a switching circuit such as an FET.

The A/D converter 158d converts the (analogue) voltage at both ends of the resistor inserted in series into a motor winding into a digital value. The calculator 157 divides the digital value by a resistance value and finds a motor current value. Moreover, the calculator 157 finds a bit output torque by multiplying a torque constant of the motor 144 by a reduction gear ratio.

The driver 140 includes a motor 144, a gear unit 141a, and encoder 148 in a driver mechanical unit.

The gear 141a is housed in the casing 141, increases an output torque of the motor 144 by a reduction ratio, and rotates the bit 142. Instead, the bit rotation velocity is reduced to 1/(reduction ratio). When the screw fastening torque is small, the motor rotation can be transmitted to the bit as it is without using the reduction machine, such as gears, and the reduction ratio can be made 1 in that case.

The motor 144 depicted in FIG. 9 is a brush DC servo motor configured to generate a torque in proportion to the motor current. The motor 144 can use a three-phase brushless motor by adding a sine commutation control unit using motor rotation angle information measured by the encoder 148 so as to serve as a brush. The motor 144 is equivalent with the DC servo motor at a manipulation amount (inlet) and at a motor current (outlet), and its basic operation is similar to that of the DC servo motor.

The encoder 148 is an incremental type encoder configured to measure a rotation amount of the motor 144, and to generate a rectangular wave signal that switches for each fine rotation amount by detecting the darkness and brightness of the light that transmits slits in the scale. In an encoder that generates two-phase rectangular waves having a phase difference of 90°, a rotational direction can be detected by analyzing the fast or slow angle of the signal. The encoder 148 may use an absolute type encoder configured to detect an absolute angle of the motor 144 without using a counter. The encoder 148 directly reads a rotation angle in the calculator 157. The calculator 157 stores the rotation angle at the operation start time rather than the initialization, and finds a rotation amount during the operation which is a motor rotation amount since the operation has been started, by subtracting the memorized value from the detected value.

The first driver 140A and the second driver 140B have approximately similar structures and similarly act. The first driver 140A is different from the second driver 140B in that the calculator 157 further includes a pause/release unit 157c. The pause/release unit 157c is configured to make zero a velocity command value to the motor 144A and to pause the motor 144A when the measurement value of the angular counter 158a reaches the predetermined bit rotation amount. The pause/release unit 157c is further configured to release the pause of the motor 144A after the setting time period passes. The screwdriver 140 of each axis is independently driven after it is run.

Figure 10:
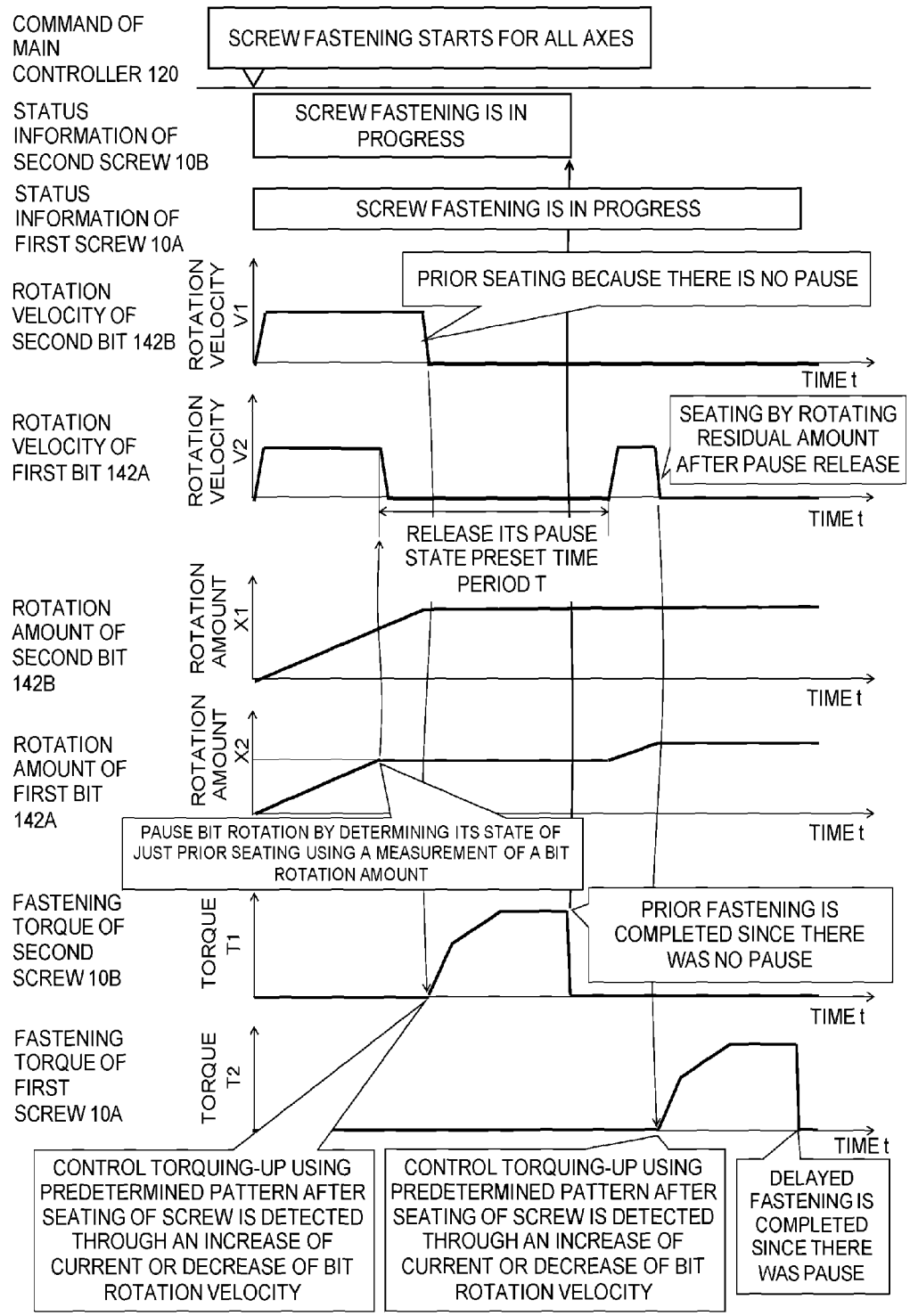
FIG. 10 is a timing chart for explaining an illustrative operation of the control system depicted in FIG. 9.

FIG. 10 shows a timing chart in this case. It is understood that the pause time is determined by the bit rotation amount and torquing-up of the second screw 10B ends in the pause period T. Next follows seating and torquing-up of the first screw 10A.

According to another embodiment that uses the structure depicted in FIG. 9, the first driver 140A is different from the second driver 140B in that the calculator 157 further includes a pause/release unit 157c. The pause/release unit 157c is configured to make zero a velocity command value to the motor 144A and to pause the motor 144A when the measurement value of the angular counter 158a reaches the predetermined bit rotation amount. The pause/release unit 157c is further configured to release the pause of the motor 144A in response to a command from the main controller 120. The screwdriver 140 of each axis is independently driven in response to the command from the main controller 120.

The main controller 120 initially issues a screw fastening start command to of all axes. In addition, the main controller 120 issues a pause release command to the paused first driver 140A when detecting that the screw fastening is completed for all axes of the second drivers 140B through a reference to status information of each axis or an interruption notice from the axis that has completed screw fastening. Alternatively, if necessary, the main controller 120 may issue the pause release command when fastening proceeds to a predetermined torque level before fastening is completed rather than in response to a completion of fastening. In that case, the second driver 140B is configured to inform the main controller 120 of status information indicating that the predetermined torque level has been reached.

Figure 11:
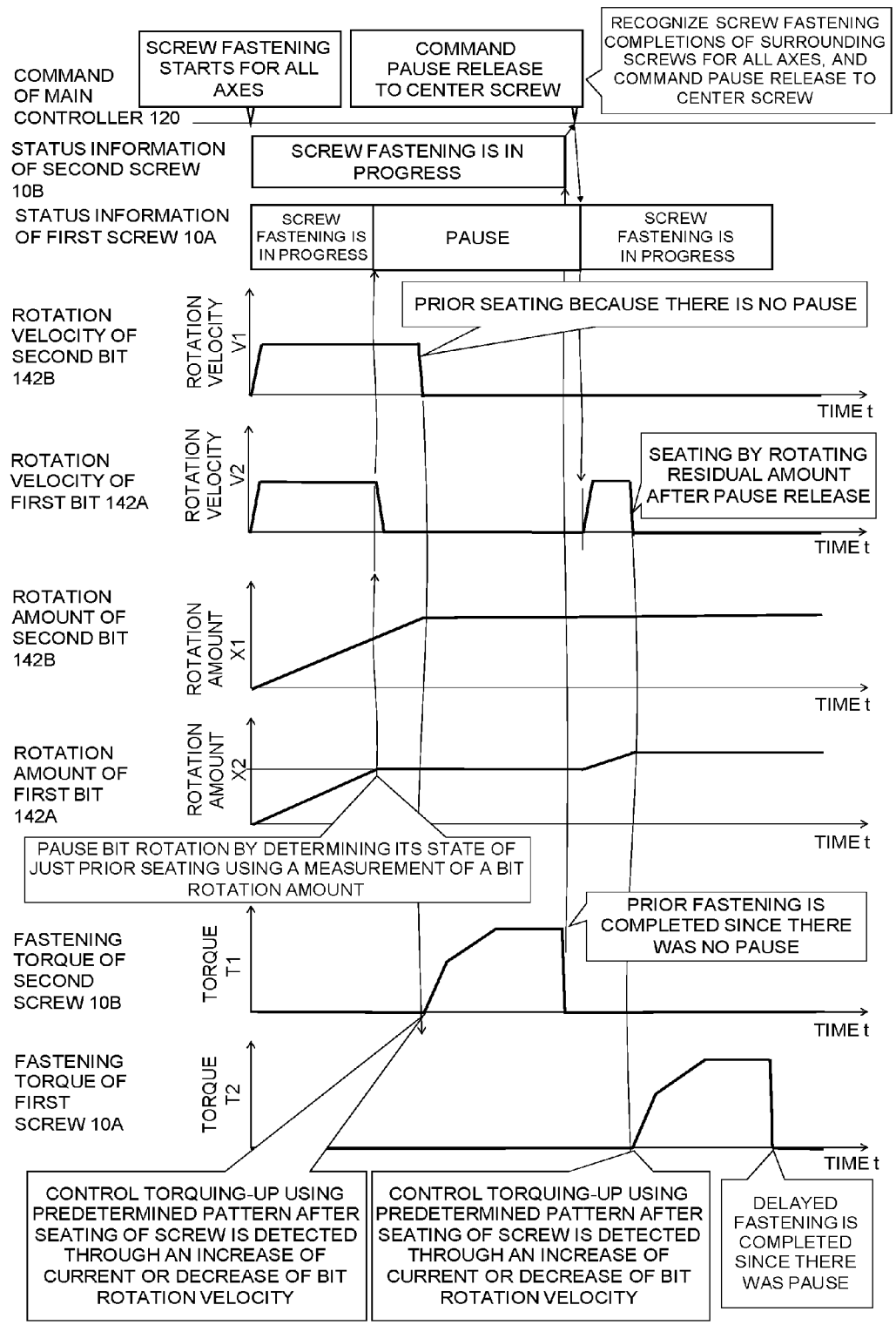
FIG. 11 is a timing chart for explaining another illustrative operation of the control system depicted in FIG. 9.

FIG. 11 shows a timing chart in this case. It is understood that the pause time is determined by the bit rotation amount, and the pause is released when the main controller 120 sends a pause release signal after the main controller 120 recognizes that torquing-up of the second screw 10B ends. The status detector 147 detects whether the torquing-up of the second screw 10B ends by referring to the status information of the second screw 10B. After the main controller 120 sends the pause release command, seating and torquing-up of the first screw 10A follow.

Figure 12:
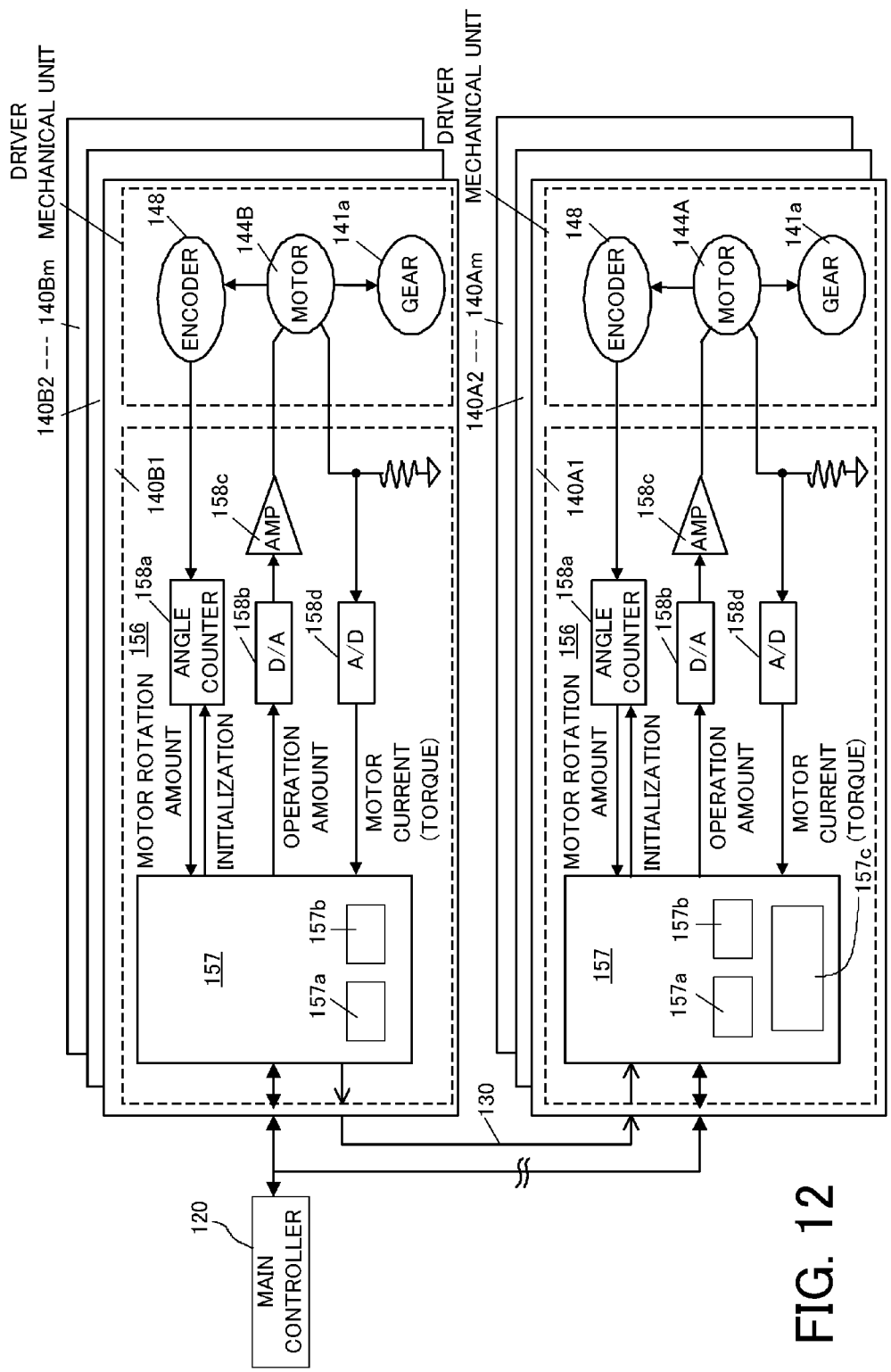
FIG. 12 is a block diagram of another variation of a servo controller of the screw fastener depicted in FIG. 1.

According to still another embodiment, the first driver 140A and the second driver 140B have approximately similar structures and similarly act in the structure depicted in FIG. 12. The second driver 140B has a route 130 to directly send a screw fastening completion signal (or status information) to the first driver 140A without intervening the main controller 120. In the first driver 140A, the calculator 157 is programmed to make zero a velocity command value to the first motor 144A and pauses the first motor 144A when the measurement value of the angular counter 158a reaches the predetermined bit rotation amount, to recognize the completions of the screw fastening actions of all axes based on information directly obtained from the route 130 without intervening the main controller 120 (and through logic operations if there are a plurality of axes), and to release the pause by its self determination.

Alternatively, if necessary, the pause release may be issued when fastening proceeds to the predetermined torque level (such as 95% of torquing-up) before fastening is completed rather than in response to a completion of fastening. In that case, the second driver 140B is configured to inform the first driver 140A of a signal indicating that the predetermined torque level has been reached.

Figure 13:
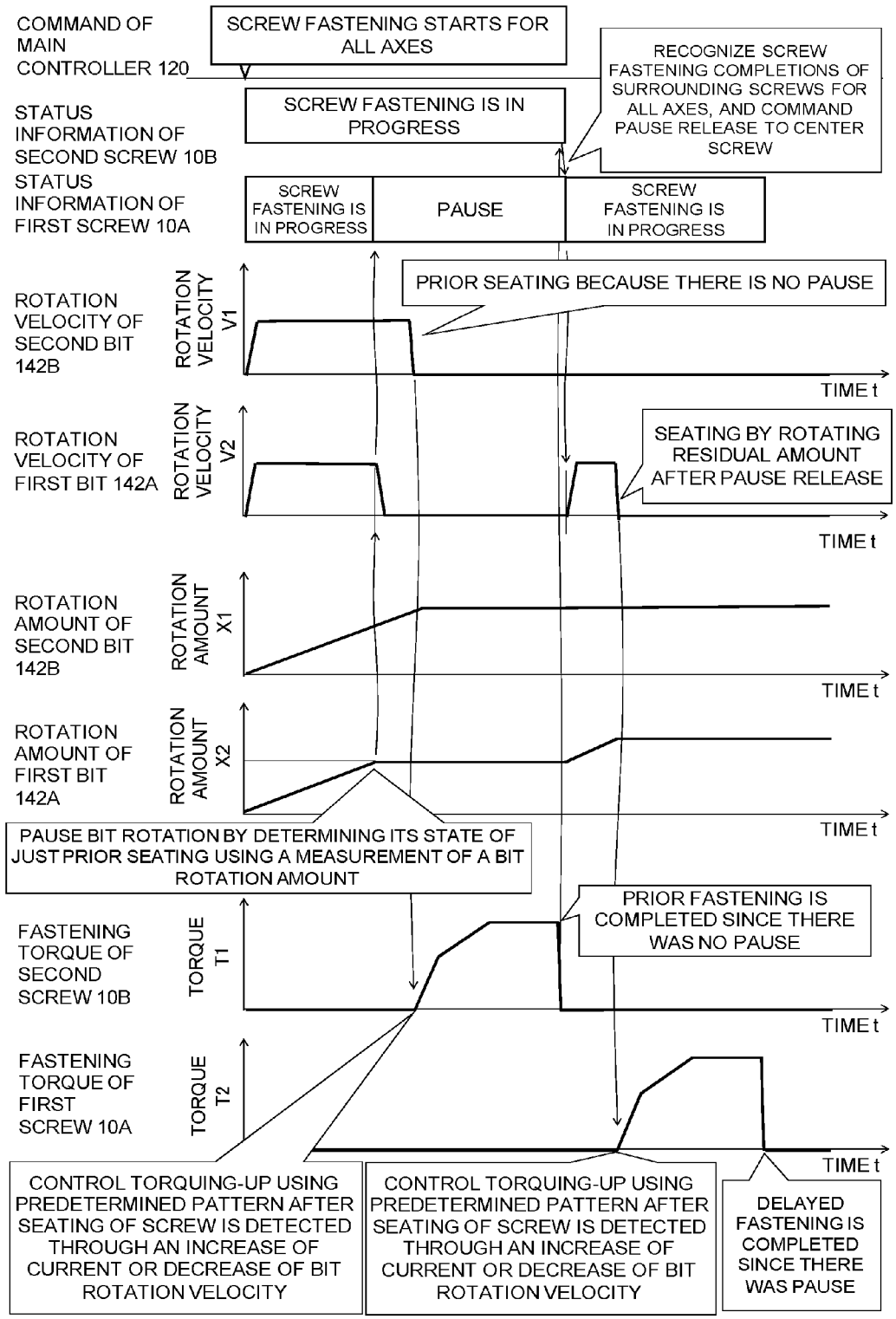
FIG. 13 is a timing chart for explaining another illustrative operation of the control system depicted in FIG. 12.

FIG. 13 shows a timing chart in this case. It is understood that the pause time is determined by the bit rotation amount, and the pause is released when the pause release signal is sent after the first driver 140A recognizes that torquing-up of the second screw 10B is completed through a notice from the second driver 140B. Next follows seating and torquing-up of the first screw 10A.

For a plurality of second screws 10B, fastening of these second screws 10B may be synchronized with each other. For a plurality of first screws 10A, fastening of these first screws 10A may be synchronized with each other. Thereby, the deformations, positional shifts, and inclinations of the work can be reduced.

For example, each second driver 140B has the above state detector 147. Assume that a plurality of stages are set up to the setting torque necessary for torquing-up of the second screws 10B, and a target torque is set to each stage. When the main controller 120 receives notices that the target torques are reached of the current stage from all the state detectors 147 of the plurality of second drivers 140B, the main controller 120 transfers the target torques to the next stages and may control the second motors 144B so that the transfer timings shift among the second screwdrivers 140B. For example, screws are simultaneously fastened every pair (such as 140B1 and 140B2) in the second screwdrivers 140B, and the fastening time is shifted for each pair. This technique is described in detail in Patent Document 7, and a detailed description thereof will be omitted.

An embodiment that applies a method described in Patent Document 7 and enables a screwdriver to change screw fastening timings and to automatically release the pause state without intervening the main controller 120 as depicted in FIGS. 12 and 13. In FIG. 4, the calculator 157 of the servo controller 150 of each screwdriver 140 has a counter function configured to count the number of synchronization waiting states. The synchronization waiting counter is set to 0 in the initialization.

FIGS. 16A to 16E show a computer program used to control an operation relating to the synchronization executed by the calculator 157 in each screwdriver depicted in FIG. 4.

Figure 16A:
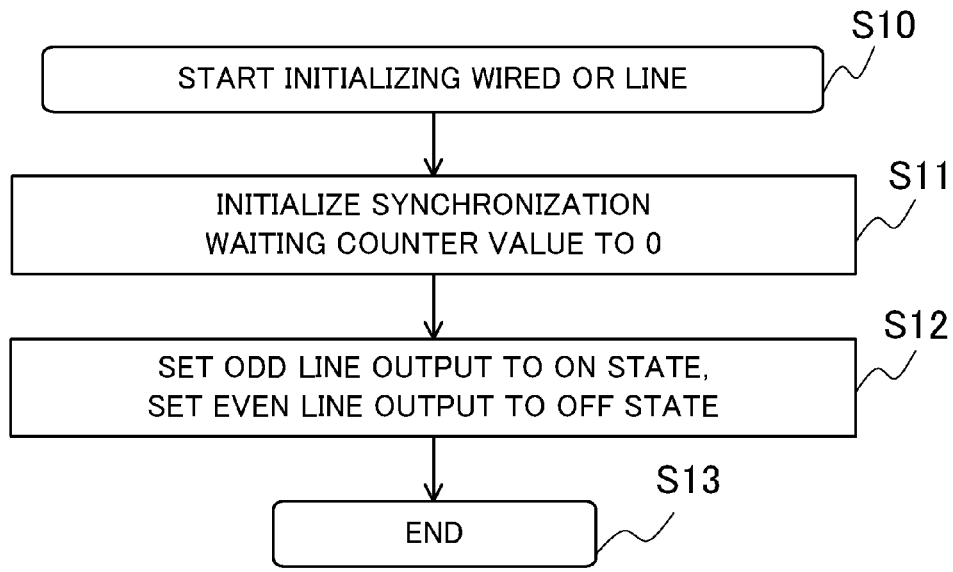
FIGS. 16A-16E are flowcharts used to explain illustrative wired OR line operations depicted in FIG. 4.

FIG. 16A is a control flowchart of an initialization of each screwdriver executed when the power is projected and when a series of screw fastening actions are completed. Initially, at step (which is abbreviated as "S" in FIGS.) 10, the calculator 157 starts an initialization since the synchronization point 5 is set (see the timing chart depicted in FIG. 17, which will be described later). At step 11, the calculator 157 resets a counter value of the synchronization waiting counter to 0. Next, at step 12, the calculator 157 turns off the even line output and turns on the odd line output. Thereby, the even wired OR line OR2 is turned off, and the odd wired OR line OR1 is turned on. Next, at step 13, the initialization flow ends.

Figure 16B:
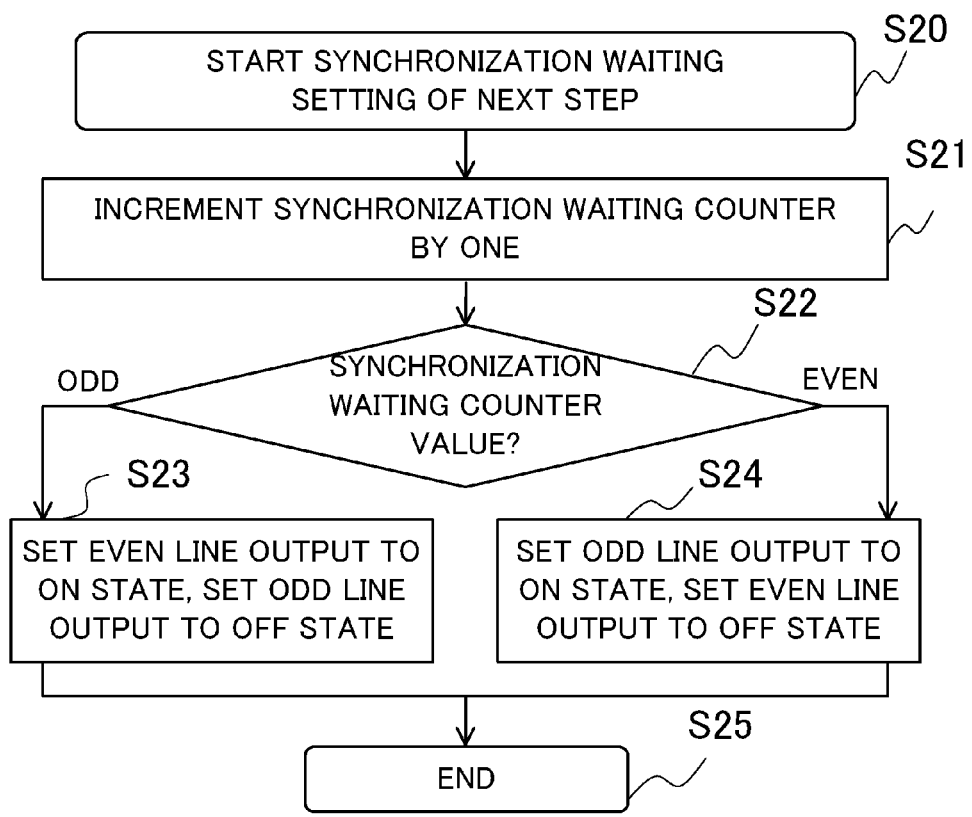

FIG. 16B is a flowchart relating to state settings of even and odd line outputs executed when the seating action is completed in each screwdriver and when torquing up and down is completed in each screwdriver. Initially, at step 20, when the calculator 157 recognizes seating or torquing-up or torquing-down, the flow moves to step 21. At the step 21, the calculator 157 increments a counter value of the synchronization waiting counter by 1. Next, at step 22, the calculator 157 determines whether the counter value of the synchronization waiting counter is odd or even. When it is odd, at step 23, the calculator 157 turns on the even line output and turns on the odd number line output. When each of all the screwdrivers becomes in this state, the even wired OR line OR2 turns on while the odd wired OR line OR1 switches from the ON state to the OFF state. On the other hand, at the step 22, when the counter value of the synchronization waiting counter is even, the flow moves to step 24, in which the calculator 157 turns off the even line output and turns on the odd line output. When each of all the screwdrivers becomes in this state, the odd wired OR line OR1 turns on whereas the even wired OR line OR2 switches from the ON state to the OFF state.

Figure 16C:
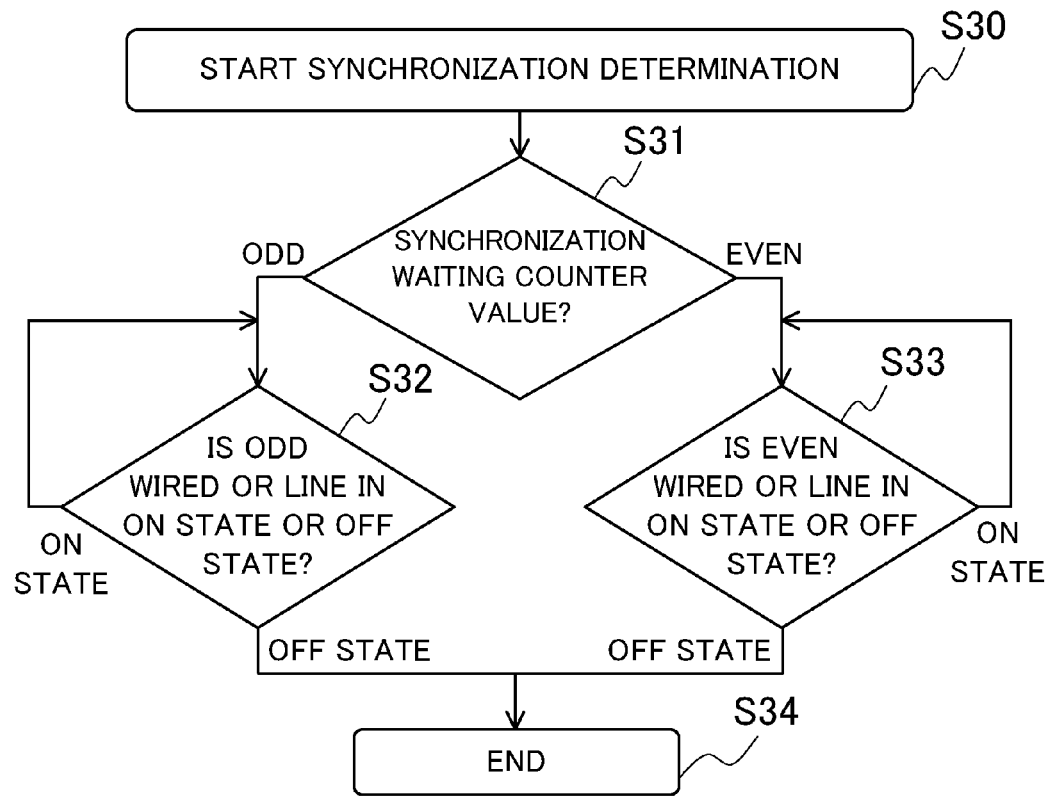

FIG. 16C shows a synchronization determination flowchart. At step 30, the calculator 157 starts a synchronization determination, and determines, at the next step 31, whether the synchronization waiting counter value is odd or even. When it is odd, the flow moves to step 32, in which the calculator 157 determines whether the odd wired OR line OR1 is in the ON state or OFF state. When it is in the ON state, the step 32 is repeated. On the other hand, when the counter value of the synchronization waiting counter is determined even, at step 31, the flow moves to the step 33, in which the calculator 157 determines whether the even wired OR line OR2 is in the ON state or OFF state. When it is determined to be in the ON state, the step 33 is repeated. When the odd wired OR line is in the OFF state at step S32 or the even wired OR line is in the OFF state at step S33, the flow end (S34).

Figure 16D:
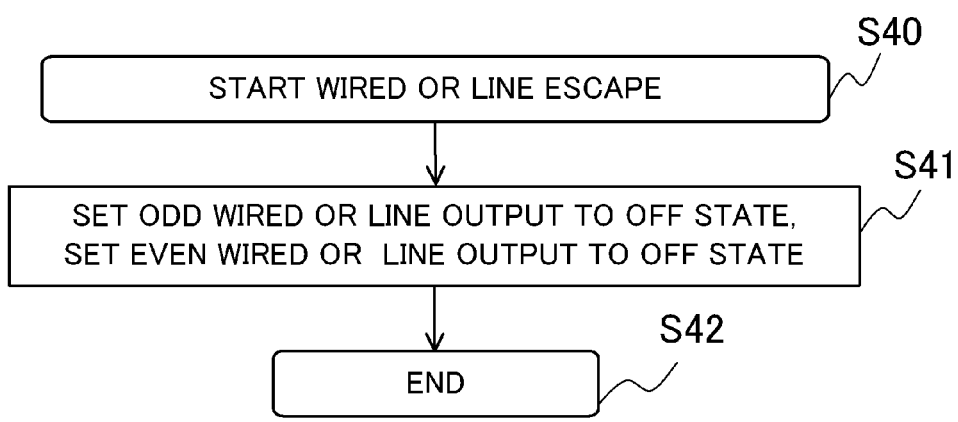

FIG. 16D is a control flowchart of a wired OR line escape action of the first screwdriver 140A. Initially, at step 40, the calculator 157 starts an escape action when the synchronization point 1 is set. Next, at step 41, the calculator 157 turns off the even line output and turns on the odd line output. Finally, at step 42, the flow ends.

Figure 16E:
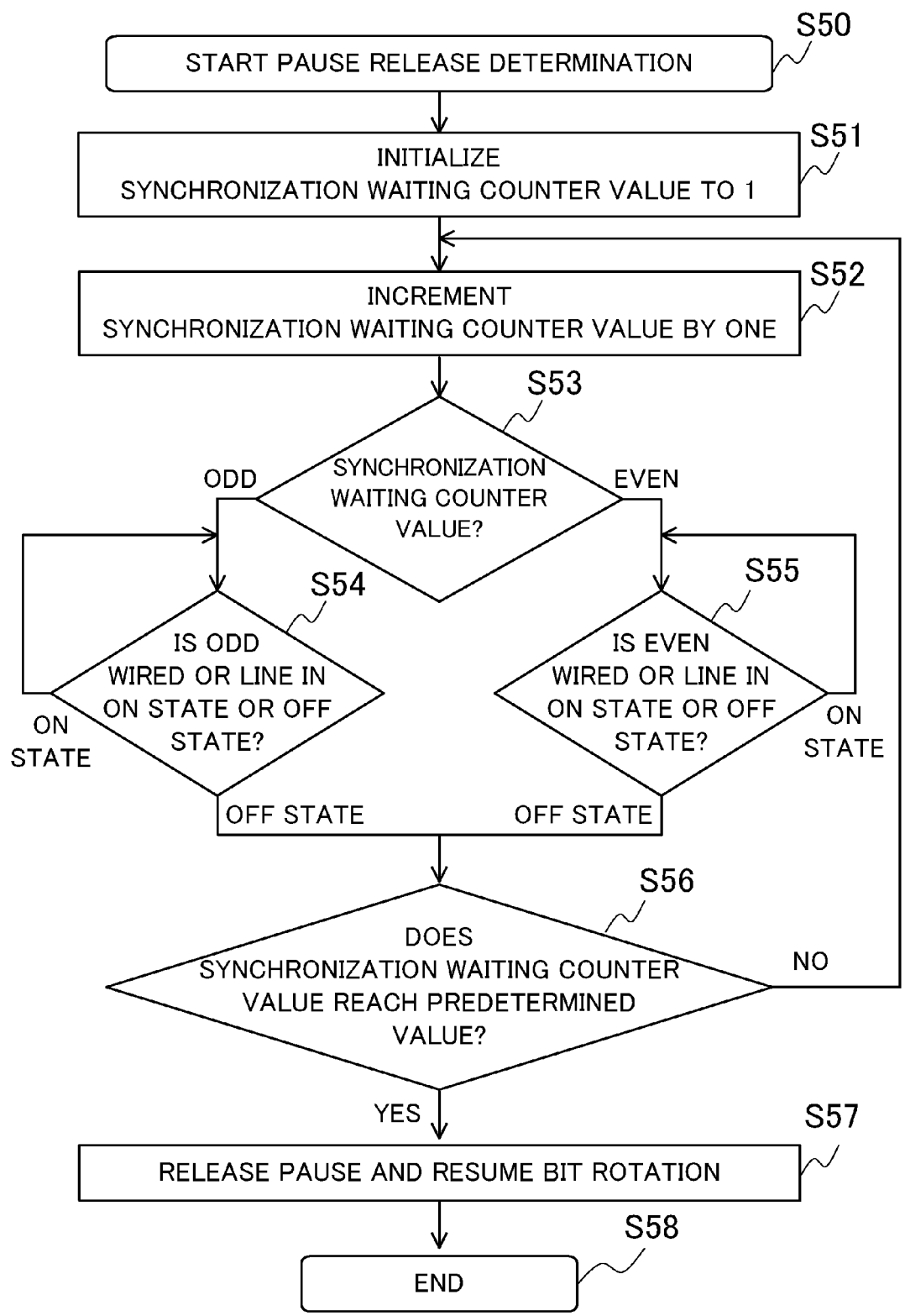

FIG. 16E is a pause release determination flowchart of the first screwdriver 140A. Initially, at step 50, the calculator 157 starts a pause release determination, and initialize the counter value of the synchronization counter to 1 at step 51. At step 52, the calculator 157 increments the counter value of the synchronization waiting counter by one, and the flow moves to step 53.

At the step 53, the calculator 157 determines whether the counter value of the synchronization waiting counter is odd or even. If it is odd, the flow moves to step 54. At the step 54, the calculator 157 determines whether the odd wired OR line OR1 is in the ON state or OFF state. If it is in the ON state, the step 54 is repeated. If it is in the OFF state, the flow moves to step 56. On the other hand, at the step 53, when the counter value of the synchronization waiting counter is determined even, the flow moves to the step 55. At the step 55, the calculator 157 determines whether the even wired OR line OR2 is in the ON state or OFF state. If it is in the ON state, the step 55 is repeated. If it is in the OFF state, the flow moves to step 56.

At the step 56, the calculator 157 determines whether the counter value of the synchronization waiting counter reaches a predetermined value. When the synchronization waiting counter value does not reach the predetermined value, the flow returns to the step 52, and this routine is repeated until the synchronization waiting counter value reaches the predetermined value. When the synchronization waiting counter value reaches the predetermined value, the flow moves to step 57. At the step 57, the calculator 157 releases the pause of the first driver 140A and resumes the bit rotation. At step 58, the pause state release determination flow ends.

Figure 17:
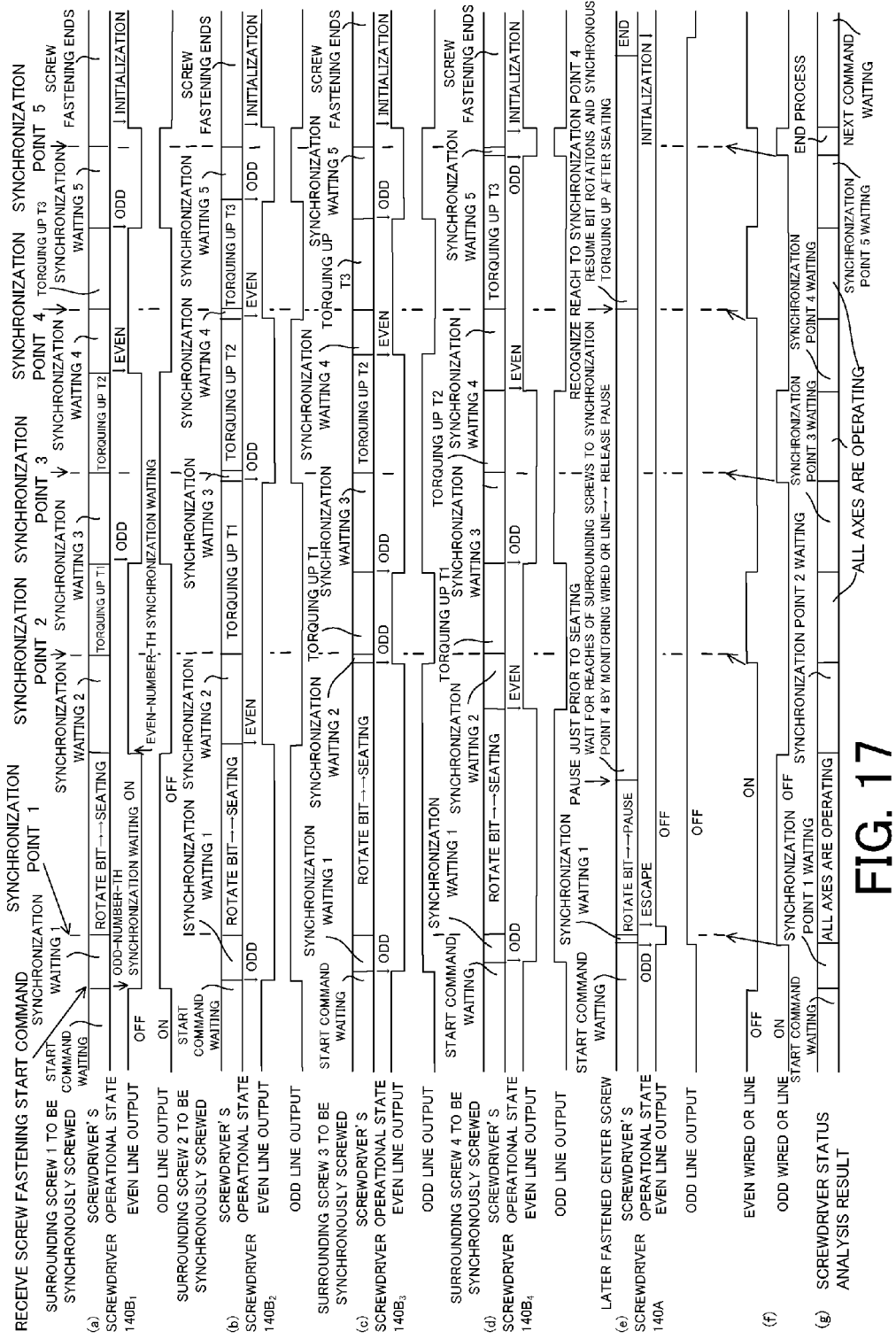
FIG. 17 is a timing chart for explaining another illustrative operation of the control system depicted in FIG. 4.

FIG. 17 is a screw fastening control procedure and an operational timing chart for each of the screwdrivers 140A and 140B, and shows a screw fastening action state with one first screw 10A and four second screws 10B. These four screwdrivers 140B are distinguished by reference numerals 140B1 to 140B4.

When the screwdriver 140A and the screwdrivers 140B1 to 140B4 receive the screw fastening start command, they synchronously fasten screws. For each of the first screwdriver 140A and the second screwdriver 140B, the even line output turns on and the odd line output turns off by a synchronization waiting 1 subsequent to the screw fastening start command, and the bits are rotated at the synchronization point 1. The second screwdriver 140B allows screws to seat without pausing whereas the first screwdriver 140A pauses the bit just before seating. In addition, since the first screwdriver 140A does not participate in the subsequent synchronous fastening, the first screwdriver 140A turns off the odd line output 153 and the even line output 155 as in the step 41 in FIG. 16D (so that the synchronization waiting can end). Next, the second screwdriver 140B waits for an even-number-th synchronization, and the even line output turns off and the odd line output turns on. Torquing-up T1 follows at a synchronization point 2. The torquing-up T1 corresponds to a predetermined ratio of a required torquing-up amount. Then, the second screwdriver 140B synchronously moves to torquing-up T2 (such as 95% of the required torquing-up amount). At this time, the counter value of the synchronization waiting counter becomes a synchronization point 4.

The first screwdriver 140A pauses the bit rotation just before seating, and maintains the pause until the synchronization waiting counter value reaches the synchronization point 4. When the synchronization waiting counter value reaches the synchronization point 4, the first driver 140A releases the pause and rotates the bit as depicted in the step 57 in FIG. 16E, and executes seating and torquing-up asynchronous with the second screwdriver 140B. Each second screwdriver 140B completes the screw fastening faster than the first screwdriver 140A, and initializes the synchronization waiting counter value as depicted in the step 11 in FIG. 16A. The first driver 140A completes screw fastening later than each second driver 140B, and initializes the synchronization waiting counter value. Such screw fastening can reduce the deformations, positional shifts, and inclinations of the work.

Here, the route 130 in FIG. 12 corresponds to the wired OR lines 160a and 160b depicted in FIG. 4, and their states are taken in by the motor controller 158 from the odd line input 152 and the even line input 154 of the servo controller of each axis, and the program of FIGS. 16A to 16E and 17 is independently executed by each axis. When the servo controller of each axis stores information in advance on which the servo controller belongs to, a prior screw fastening group 140B or a later screw fastening group 140A, these groups provide the operation of FIG. 17 as a whole because the prior screw fastening group 140B executes the process of the FIGS. 16A-16C independently and the subsequent screw fastening group 140A executes the process of FIGS. 16A, 16C, 16D, and 16E independently. The grouping information may be written down as a parameter in a memory, such as an EEPROM in the servo controller 150 if the function is approximately fixed or the grouping status may be made semi-fixed or variable through a switch, etc. When the function changes every screw fastening, the grouping information may be set as a parameter annexed to the screw fastening start command.

As another method, a signal of the wired OR line may be taken in by connecting it to the main controller 120 and the main controller 120 may have a synchronization waiting counter function or receive the information on this counter value through a communication from each screwdriver. This case corresponds to the method depicted in FIG. 11, and the main controller 120 instructs the pause release timing. Disadvantageously, this method may cause a delay of the pause release timing because the main controller 120 commands the pause release via the communication line. This method is not as fast as the former method that directly monitors the wired OR line no matter how the communication velocity is increased. In addition, a program of the main controller 120 becomes complex, and as the number of screws increases the number of processes in the main controller 120 increases. On the other hand, according to the former method in which the servo controller of each axis autonomously determines the pause release, no matter how the number of axes of the screwdrivers 140A and 140B increases, the programs of the main controller 120 and the servo controller 150 do not become complex, the communication does not become crowed, and the number of screws can be easily adjusted as long as the number of connections among the servo controllers is increased.

The embodiments can provide a screw fastener that can provide at least one of a smaller configuration, less expensiveness, and an increase of a throughput.

A screw fastener according to one aspect of the embodiment includes a first screwdriver including a first bit configured to fasten a first screw by engaging with a recess of the first screw, and a first motor configured to rotate the first bit, a second screwdriver including a second bit configured to fasten a first screw by engaging with a recess of the second screw, and a second motor configured to rotate the second bit, an elevator unit configured to simultaneously ascend and descend both the first screwdriver and the second screwdriver, and a controller configured to control the first motor and the second motor so that seating of the first screw can start after torquing-up of the second screw starts. Since the elevator unit is commonly used for the first screwdriver and the second screwdriver, this screw fastener is smaller and less expensive than a screw fastener in which the first screwdriver and the second screwdriver have separate elevator units. Since the elevator action is commonly used, the screw fastening time period can become shorter and the throughput improves than a screw fastener which provides two elevator actions. Here, a phrase "after torquing-up starts" intends to cover a completion of torquing-up or its progress (such as 95% of a torquing-up completion).

The screw fastener may further include a rotation detector configured to detect a rotation amount of the first bit, and a memory configured to store a predetermined rotation amount of the first bit before the first screw is seated after fastening of the first screw starts. The controller may control driving of the first motor and driving of the second motor so that the first bit and the second bit can simultaneously rotate for fastening, the first motor can pause when the detection amount detected by the rotation detector reaches the predetermined rotation amount stored in the memory, and the fast motor can later resume. The rotation detector is, for example, an encoder. That the first bit and the second bit "simultaneously rotate" intends to allow a time difference that can be regarded as a simultaneous rotation. The resume time is the time when torquing-up of the second screw proceeds to some extent. By fastening the first screw to a state prior to seating with the second screw, the throughput becomes higher than a throughput in which the first screw starts rotating after torquing-up of the second screw proceeds to some extent. Therefore, in order to maximize the throughput, the predetermined rotation amount stored in the memory may be a rotation amount just before the first screw is seated. In this case, the controller may be provided in the first motor or a host controller outside of the first driver.

The screw fastener may further include a timer, and a memory configured to store a setting time period, and the controller initially stops the first motor and drives the second motor and then drives the first motor when determining that the timer measures the setting time period. In this case, the start time of the first motor is determined by the motor. It is optional that the first bit completes fastening the first screw simultaneous with a completion of fastening of the second screw by the second bit. Since the state of the second bit is not actually detected, the control system becomes simpler and thus less expensive. The setting time period is a time period necessary for torquing-up of the second screw to proceed to some extent.

The screw fastener may further include a timer, and the memory may further store a setting time period. The controller may resume driving of the first motor when determining that the timer measures the setting time period. In this case, the resume time of the first motor is determined by the timer. Even in this case, since the state of the second bit is not actually detected, the control system becomes simpler and thus less expensive. The setting time period is a time period necessary for torquing-up of the second screw to proceed to some extent.

The screw fastener may further include a state detector configured to detect a torquing-up state of the second screw, and a memory configured to store a setting state. The controller initially stops the first motor and drives the second motor and then drives the first motor when determining that the state detector detects the setting state stored in the memory. In this case, the start time of the first motor is determined by the detection result of the state detector. It is optional that the first bit completes fastening the first screw simultaneous with a completion of fastening of the second screw by the second bit. Since the first screw can be fastened when the state of the second screw actually becomes the setting state, the deformation, positional shift, and inclination of the work can be prevented. The setting state is a state in which torquing-up of the second screw proceeds to some extent.

The screw fastener may further include a state detector configured to detect a torquing-up state of the second screw, and the memory may further store a setting state. The controller may resume driving of the first motor when determining that the state detector detects the setting state stored in the memory. In this case, the resume time of the first motor is determined by the detection result of the state detector. Even in this case, since the first screw can be fastened when the state of the second screw actually becomes the setting state, the deformation, positional shift, and inclination of the work can be prevented. The setting state is a state in which torquing-up of the second screw proceeds to some extent. The controller may determine that the state detector detects the setting state stored in the memory when a rotation velocity of the second bit detected by the state detector is zero.

The first screw may have a screw portion longer than that of the second screw. Thereby, seating of the first screw can be made later than seating of the second screw even when the second screw and the first screw are fastened at the same bit rotation velocity. Thus, by adjusting a difference of the length between the screw portion of the first screw and the screw portion of the second screw, torquing-up of the second screw can proceed to some extend until seating of the first screw is completed.

The controller may control the first motor and the second motor so that a rotation velocity of the first bit can be smaller than that of the second bit. Thereby, even when the screw portion of the first screw and the screw portion of the second screw have the same length or different lengths, seating of the first screw can be made later than seating of the second screw even when the second screw and the first screw are simultaneously fastened. By properly securing a rotational velocity difference between both bits, torquing-up of the second screw can proceed to some extend until seating of the first screw is completed.

The screw fastener may include a plurality of second screwdrivers, and the controller may torque up the plurality of second screws by synchronizing driving of second motors of the plurality of second screwdrivers. This configuration can reduce the deformation, the positional shift, and inclination of the work. For example, each second screwdriver may include a state detector configured to detect a state of a corresponding one of the second motors. There may be a plurality of stages up to a set torque necessary to torque up the second screws and a target torque is set to each stage. The controller may control the second motors so that a current stage can be transferred to a set torque of a next stage when receiving notices from all state detectors of the plurality of second screwdrivers that a target torque has been reached in the current state.

Alternatively, each second screwdriver may include a state detector configured to detect a state of a corresponding one of the second motors and connected to the controller by a wired OR line, and a counter configured to increment a counter value by one whenever a synchronization waiting state is set. Each state detector may switch an output to a first wired OR line from a first state to a second state in a synchronization waiting state of an odd counter value, and switches an output to a second wired OR line from the second state to the first state in a synchronization waiting state of an even counter value. The controller may determine an odd-number-th synchronization when a state of the first wired OR line switches from the first state to the second state after all the second screwdrivers become in odd-number-th synchronization waiting states, and may determine an even-number-th synchronization when a state of the second wired OR line switches from the first state to the second state after all the second screwdrivers become in even-number-th synchronization waiting states. Since the wired OR is equivalent with an AND circuit, all second screwdrivers can be synchronized with each other. This is applied to the first screwdrivers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:
1. A screw fastener comprising:
a first screwdriver including a first bit configured to fasten a first screw by engaging with a recess of the first screw, and a first motor configured to rotate the first bit;
a plurality of second screwdrivers each including a second bit configured to fasten a second screw by engaging with a recess of the second screw, and a second motor configured to rotate the second bit;
an elevator unit configured to simultaneously ascend and descend both the first screwdriver and the second screwdriver; and
a controller configured to control the first motor and the second motor so that seating of the first screw can start after torquing-up of the second screw starts,
wherein the controller torques up the plurality of second screws by synchronizing driving of the second motors of the plurality of second screwdrivers, and
wherein each second screw driver includes a state detector configured to detect a state of a corresponding one of the second motors and connected to the controller by a wired OR line; and
a counter configured to increment a counter value by one whenever a synchronization waiting state is set,
wherein each state detector switches an output to a first wired OR line from a first state to a second state in a synchronization waiting state of an odd counter value, and switches an output to a second wired OR line from the second state to the first state in a synchronization waiting state of an even counter value, and
wherein the controller determines an odd-number-th synchronization when a state of the first wired OR line switches from the first state to the second state after all the second screwdrivers become in odd-number-th synchronization waiting states, and determines an even-number-th synchronization when a state of the second wired OR line switches from the first state to the second state after all the second screwdrivers become in even-number-th synchronization waiting states.

2. The screw fastener according to claim 1, further comprising:
- a rotation detector configured to detect a rotation amount of the first bit; and
- a memory configured to store a predetermined rotation amount of the first bit before the first screw is seated after fastening of the first screw starts,
- wherein the controller controls driving of the first motor and driving of the second motor so that the first bit and the second bit can simultaneously rotate for fastening, the first motor can pause when the detection amount detected by the rotation detector reaches the predetermined rotation amount stored in the memory, and the fast motor can later resume.

3. The screw fastener according to claim 2, further comprising a timer, the memory further storing a setting time period,
- wherein the controller resumes driving of the first motor when determining that the timer measures the setting time period.

4. The screw fastener according to claim 2, wherein the first screwdriver includes the controller.

5. The screw fastener according to claim 2, further comprising a state detector configured to detect a torquing-up state of the second screw, the memory further storing a setting state,
- wherein the controller resumes driving of the first motor when determining that the state detector detects the setting state stored in the memory.

6. The screw fastener according to claim 1, further comprising a timer, and a memory configured to store a setting time period,
- wherein the controller initially stops the first motor and drives the second motor and then drives the first motor when determining that the timer measures the setting time period.

7. The screw fastener according to claim 1, further comprising:
- a state detector configured to detect a torquing-up state of the second screw; and
- a memory configured to store a setting state,
- wherein the controller initially stops the first motor and drives the second motor and then drives the first motor when determining that the state detector detects the setting state stored in the memory.

8. The screw fastener according to claim 7, wherein the controller determines that the state detector detects the setting state stored in the memory when a rotation velocity of the second bit detected by the state detector is zero.

9. The screw fastener according to claim 1, wherein the first screw has a screw portion longer than that of the second screw.

10. The screw fastener according to claim 1, wherein the controller controls the first motor and the second motor so that a rotation velocity of the first bit can be smaller than that of the second bit.

11. The screw fastener according to claim 1, wherein each second screwdriver includes a state detector configured to detect a state of a corresponding one of the second motors,
- wherein there are a plurality of stages up to a set torque necessary to torque up the second screws and a target torque is set to each stage, and
- wherein the controller controls the second motors so that a current stage can be transferred to a set torque of a next stage when receiving notices from all state detectors of the plurality of second screwdrivers that a target torque has been reached in the current state.

12. The screw fastener according to claim 1, wherein the screw fastener includes a plurality of first screwdrivers, and
- wherein the controller torques up the plurality of first screws by synchronizing driving of first motors of the plurality of first drivers with each other.

* * * * *